(12) United States Patent
Yoshinari

(10) Patent No.: US 9,514,288 B2
(45) Date of Patent: Dec. 6, 2016

(54) INFORMATION PROCESSING DEVICE, INFORMATION PROCESSING METHOD, PROGRAM AND STORAGE MEDIUM

(71) Applicant: Rakuten, Inc., Tokyo (JP)

(72) Inventor: Tatsuya Yoshinari, Tokyo (JP)

(73) Assignee: Rakuten, Inc., Tokyo (JP)

( * ) Notice: Subject to any disclaimer, the term of this patent is extended or adjusted under 35 U.S.C. 154(b) by 0 days.

(21) Appl. No.: 14/426,791

(22) PCT Filed: Aug. 22, 2013

(86) PCT No.: PCT/JP2013/072453
§ 371 (c)(1),
(2) Date: Mar. 9, 2015

(87) PCT Pub. No.: WO2015/025404
PCT Pub. Date: Feb. 26, 2015

(65) Prior Publication Data
US 2015/0248543 A1 Sep. 3, 2015

(51) Int. Cl.
*G06F 21/10* (2013.01)
*G06Q 50/10* (2012.01)
(Continued)

(52) U.S. Cl.
CPC ............. *G06F 21/105* (2013.01); *G06F 21/10* (2013.01); *G06F 21/31* (2013.01);
(Continued)

(58) Field of Classification Search
None
See application file for complete search history.

(56) References Cited

U.S. PATENT DOCUMENTS

2004/0117784 A1* 6/2004 Endoh .................... G06F 21/10
717/169
2006/0179058 A1* 8/2006 Bram .................... G06F 21/121
(Continued)

FOREIGN PATENT DOCUMENTS

JP 2006-178658 A 7/2006
JP 2010-146169 A 7/2010
(Continued)

OTHER PUBLICATIONS

Nikkei Software, "Visual Basic Web", Mar. 2012, pp. 104-109.
(Continued)

*Primary Examiner* — David Le
(74) *Attorney, Agent, or Firm* — Sughrue Mion, PLLC

(57) ABSTRACT

The present invention is to ensure information safety of a user of service using API. An information processing device issues a service code in response to an API use request. The API use request relates to service using an application program that uses API and is transmitted from an application provider device. The information processing device makes service identification information and use API information correspond to the service code and registers the service identification information, the use API information, and the service code. According to user-specific information from the application provider, unapproved license information is issued for each application user. Approval of this license information by the application user side registers the license approval information. At service execution, authentication is performed based on the service code and the license information. When the authentication is passed, API use is permitted.

28 Claims, 26 Drawing Sheets

(51) Int. Cl.
*G06F 21/31* (2013.01)
*G06F 21/62* (2013.01)
*H04L 29/08* (2006.01)

(52) U.S. Cl.
CPC ......... *G06F 21/6218* (2013.01); *G06Q 50/10* (2013.01); *H04L 67/10* (2013.01)

(56) References Cited

U.S. PATENT DOCUMENTS

| | | |
|---|---|---|
| 2008/0059804 A1 | 3/2008 | Shah et al. |
| 2012/0072979 A1 | 3/2012 | Cha et al. |
| 2012/0259741 A1 | 10/2012 | Iwabuchi |
| 2013/0227153 A1* | 8/2013 | Zurmuehl ............ G06F 9/5055 709/228 |

FOREIGN PATENT DOCUMENTS

| | | |
|---|---|---|
| JP | 2010-218465 A | 9/2010 |
| TW | 200642408 A | 12/2006 |
| TW | 201129935 A | 9/2011 |
| TW | 201317830 A | 5/2013 |
| WO | 2006062998 A | 6/2006 |

OTHER PUBLICATIONS

Tsugutoshi Aoshima et al., "Toward Better Extraction and Presentation of Twitter Articles Based on Contextual Connections Among Them", Information Processing Society of Japan 2013, pp. 61-84, vol. 6, No. 2.

International Search Report for PCT/JP2013/072453 dated Nov. 12, 2013.

* cited by examiner

Fig. 19

RESULT INFORMATION OF APPLICATION PROVIDER

| V1 | | | | |
|---|---|---|---|---|
| DATE AND TIME | USE API | APPLICATION | APPLICATION USER | CHARGING DATA |
| ⋮ | ⋮ | ⋮ | ⋮ | ⋮ |

| V2 | | | | |
|---|---|---|---|---|
| DATE AND TIME | USE API | APPLICATION | APPLICATION USER | CHARGING DATA |
| ⋮ | ⋮ | ⋮ | ⋮ | ⋮ |

RESULT INFORMATION OF APPLICATION USER

| M1 | | | | |
|---|---|---|---|---|
| DATE AND TIME | USE API | APPLICATION | APPLICATION PROVIDER | CHARGING DATA |
| ⋮ | ⋮ | ⋮ | ⋮ | ⋮ |

| M2 | | | | |
|---|---|---|---|---|
| DATE AND TIME | USE API | APPLICATION | APPLICATION PROVIDER | CHARGING DATA |
| ⋮ | ⋮ | ⋮ | ⋮ | ⋮ |

INFORMATION PROCESSING DEVICE, INFORMATION PROCESSING METHOD, PROGRAM AND STORAGE MEDIUM

CROSS REFERENCE TO RELATED APPLICATIONS

This application is a National Stage of International Application No. PCT/JP2013/072453 filed Aug. 22, 2013, the contents of which are incorporated herein by reference in their entirety.

TECHNICAL FIELD

The present invention relates to an information processing device employed in service using an Application Program Interface (API), an information processing method for the information processing device, a program achieving the information processing device, and a storage medium storing the program.

CITATION LIST

Patent Literature

Patent Literature 1: JP 2006-178658 A
Patent Literature 2: JP 2010-146169 A

BACKGROUND ART

Japanese Unexamined Patent Application Publication No. 2006-178658 discloses the following. A check process is carried out in response to a registration request of a created service program. Then, whether all function modules specified to the service program are applicable function modules or not is checked. If applicable, a service identification (ID) is issued and the service ID is registered so as to correspond to a client ID. Japanese Unexamined Patent Application Publication No. 2010-146169 discloses the following. An application server performs authentication on a request from a client. When the request is an API access request, the application server transmits the authentication process result accompanied with the request to an API server. The API server performs a request process based on the authentication process result.

SUMMARY OF INVENTION

Technical Problem

For example, in a field of the Internet service, an application program executes an exchange of information between systems using an API. In use of the API, persons in various stands, such as an application provider, an application user, a server manager who provides the API, and a provider and an owner of data treated in the API, are present. The application provider provides an application program (hereinafter also referred to as a "service application"), which achieves service using the API. The application user uses the service provided by the service application. It is desired that these persons in the respective stands safely and appropriately use the API. Accordingly, an object of the present invention is to allow ensuring safety of the API use and data treated in the API without degrading usefulness of service, in particular, service using the API.

Solution to Problem

First, an information processing device according to the present invention is included in a system configured such that a plurality of application users are each able to use service brought by execution of an application program available for each user. The application program uses preliminary prepared API. The plurality of application programs are provided by one or a plurality of application providers. The information processing device includes a service code processor and a license processor. The service code processor is configured to generate a service code in response to an API use registration request transmitted from an application provider device. The API use registration request relates to service using an application program that uses the API. The service code indicates registration of the service as an API use service. The service code processor is configured to make service identification information and use API information of the service correspond to the service code and register the service identification information, the use API information, and the service code. The license processor is configured to generate license information corresponding to user-specific information transmitted from the application provider device. The user-specific information specifies a specific application user who uses the service. An information access authority of the license information using an API indicated by the use API information is unapproved. The license processor is configured to make the license information correspond to the service code and register the license information and the service code. The license processor is configured to perform issuing license information to the application user. The application user is indicated by the user-specific information corresponding to the license information. The license processor is configured to further accept license approval information from an application user device of the application user indicated by the user-specific information corresponding to the license information. The license approval information indicates an approved/disapproved state of the information access authority. The license processor is configured to make the license approval information correspond to the license information and register the license approval information and the license information. First, this information processing device is employed in the following system under the condition where a plurality of application programs are provided. Under the system, a plurality of respective service users can use service brought by execution of the application program available for each user. In the case where the information processing device receives the API use registration request of the application program, which achieves the service, from the application provider, the information processing device performs registration regarding the API use making the registration correspond to two of the service code and the license. In this case, the service code is generated in response to the API use registration request. The license information is generated corresponding to the user-specific information for the user who uses this application program. Further, the application user gives approval to the license information.

Second, in the information processing device according to the above-described present invention, the following is preferable. When the notification process for issuing the license information is performed to the application user, the license processor is configured to perform an indication process of information on the service corresponding to the license information and risk information. The application user is indicated by the user-specific information corresponding to the license information. That is, the application user can recognize the license issue based on the request from the application provider side. Moreover, the application user can know the content and the risk of the service brought by the application program. Third, in the information processing device according to the above-described present invention, the following is preferable. As the risk information related to the indication process, the license processor uses use API information regarding the service corresponding to the license information. Including the use API information in the risk information allows the application user to recognize what sort of information is specifically used in the service. Fourth, in the information processing device according to the above-described present invention, the following is preferable. The license processor is configured to accept only information of batch approval on one or the plurality of use API information notified as the risk information from the application user device as the license approval information. This allows ensuring the service provision in a state where the application provider maintains all API uses, which are original assumed. Fifth, in the information processing device according to the above-described present invention, the following is preferable. The license processor is configured to accept information of individual approval on one or the plurality of respective use API information notified as the risk information from the application user device as the license approval information. This allows the application user to restrict the API use in the service by one's own intention. Sixth, in the information processing device according to the above-described present invention, the following is preferable. The license processor is configured to register an allowable number of copies making the allowable number of copies correspond to the license information. This allows preventing an unrestricted spread of the application program to achieve the service. Seventh, in the information processing device according to the above-described present invention, the following is preferable. The license processor is configured to register terminal identification information making the terminal identification information correspond to the license information. For the application provider, this allows preventing an unrestricted spread of the application program. For the application user, this allows preventing the service use from another terminal due to impersonation, a stealing of the license, or a similar cause. Eighth, in the information processing device according to the above-described present invention, the following is preferable. The license processor is configured to perform a registration process of the terminal identification information such that the terminal identification information is able to be registered by an allowable number of copies of corresponding license information. This allows managing the number of copies of the application program with the terminal identification information. Ninth, in the information processing device according to the above-described present invention, the following is preferable. At registration of the terminal identification information, the license processor is configured to perform notifying the application user of a fact of the registration. This allows the application user to check whether another terminal illegally uses the service using the license information approved by himself/herself or not.

Tenth, in the information processing device according to the above-described present invention, the following is preferable. The service code processor is configured to provide a website. The website is configured to be able to obtain at least the service identification information and the use API information from the application provider device. The service code processor is configured to perform generating the service code in response to an acceptance of an API use registration request through the website. This allows facilitating a procedure for issuing the service code by the application provider. Eleventh, in the information processing device according to the above-described present invention, the following is preferable. The license processor is configured to provide the website. The website is configured to be able to obtain the user-specific information from the application provider device. The license processor is configured to perform generating the license information based on the user-specific information obtained through the website. This allows facilitating a procedure for issuing the license by the application provider. Twelfth, in the information processing device according to the above-described present invention, the following is preferable. The license processor is configured to provide the website. The website is configured to be able to obtain license approval information from the application provider device. The license processor is configured to perform accepting the license approval information by an instruction from the application user device through the website. The license processor is configured to perform making the license approval information correspond to the license information and registering the license approval information and the license information. This allows facilitating a procedure for the license approval by the application user. Thirteenth, in the information processing device according to the above-described present invention, the following is preferable. The API is an information access API accessible for reading out or writing in disclosure-restricted-information. In this case, regarding the service using information unique to the user or similar information, information safety or similar safety of the service brought by the application program is ensured. Fourteenth, in the information processing device according to the above-described present invention, the following is preferable. The use API information is information configured to identify one or the plurality of APIs used by the application program. This clearly registers the API used by the application program.

Fifteenth, an information processing method according to the above-described present invention is an information processing method for an information processing device included in the above-described system. The information processing method includes the following. A process generates a service code in response to an API use registration request transmitted from an application provider device. The API use registration request relates to service using an application program that uses the API. The service code indicates registration of the service as an API use service. A process makes service identification information and use API information of the service correspond to the service code and registers the service identification information, the use API information, and the service code. A process generates license information corresponding to user-specific information transmitted from the application provider device. The user-specific information specifies a specific application user who uses the service. An information access authority of the license information using an API indicated by the use API information is unapproved. A process makes the license information correspond to the service code and registers the license information and the service code. A process notifies issuing license information to the application user. The application user is indicated by the user-specific information corresponding to the license information. License approval information is accepted from an application user device of the application user indicated by the user-specific information corresponding to the license information. The license approval information indicates an approved/disapproved state of the information access authority. The license approval information is made correspond to the license information, and the license approval information and the license information are registered. This information processing method establishes the registration information to achieve the appropriate API use where the information safety is ensured. Sixteenth, a program according to the present invention is a program that causes an information processing device to perform a process to be performed as the above-described information processing method. Seventeenth, a storage medium according to the present invention is a storage medium that stores the above-described program. These program and storage medium achieve the above-described information processing device.

Eighteenth, an information processing device according to the present invention is an information processing device included in the above-described system. The information processing device includes a registration information acquisition unit and an authentication processor. The registration information acquisition unit is configured to obtain registration information where service identification information, use API information, a service code, license information, and license approval information are associated. The service identification information relates to service using an application program that uses the API. The service identification information is specified from the application provider device. The service code is configured to indicate registration of the service as API use service. The license information is generated corresponding to the user-specific information. The user-specific information is configured to identify an application user specified from the application provider device. The license approval information is configured to indicate an approved/disapproved state of the information access authority using the API indicated by the use API information. The use API information is transmitted from the application user device of the application user indicated by the user-specific information corresponding to the license information. When an API use request is performed in association with execution of the service application, the authentication processor is configured to perform an authentication process with reference to the registration information obtained by the registration information acquisition unit based on the service code and the license information regarding the API use request. The authentication process includes at least confirmation of regular registration with the service code, confirmation of match of API requested for use by the API use request and the use API information, confirmation of validity of the license information, and approval confirmation with the license approval information. The authentication processor is configured to permit the requested API use according to an authentication result. This information processing device is employed in the following system under the condition where a plurality of application programs are provided. Under the system, a plurality of respective service users can use service brought by execution of the application program available for each user. In the case where the information processing device performs the service by the application program involving the API use, the authentication using the service code and the license information are performed. The application provider provides the application program integrated with the service code. The service code is linked to the use API information and the service identification information. The application user executes the application program using the license information approved by himself/herself. Performing the authentication using the service code and the license information in this assumption restricts the service use not intended by the application user and the information access using the API.

Nineteenth, in the information processing device according to the above-described eighteenth present invention, the following is preferable. The authentication processor is configured to receive the service code and the license information and perform an authentication process. The service code and the license information are transmitted together with the API use request from an external terminal device that has executed the application program. That is, the authentication processor performs the authentication using the registration information linked to the service code and the license information transmitted together with the API use request. Twentieth, in the information processing device according to the above-described eighteenth present invention, the following is preferable. In the case where the authentication processor is able to confirm all of the service code, the service identification information, the use API information, the license information, and the license approval information, the authentication processor is configured to permit an API use related to an API use request. This achieves an operation giving first priority to ensuring safety of information. Twenty-first, in the information processing device according to the above-described eighteenth present invention, the following is preferable. The registration information includes terminal identification information corresponding to the license information. In an authentication process, the authentication processor is configured to also perform authentication on an external terminal device using the terminal identification information. The external terminal device executes the application program and transmits an API use request. This allows dealing with the illegal copy and illegal spread of the application program. Twenty-second, in the information processing device according to the above-described eighteenth present invention, the following is preferable. In response to the API use request, the authentication processor is configured to perform a notification process of generation of the API use request to the application user. The application user is indicated by the user-specific information corresponding to the license information. This allows the application user to recognize execution of the application program, giving an opportunity of determining whether the service is regularly used or not. Twenty-third, in the information processing device according to the above-described eighteenth present invention, the following is preferable. In the registration information, information on the application provider is associated with the service code. In response to the API use request, the authentication processor performs a notification process of generation of the API use request to an application provider. The application provider is indicated by information on the application provider corresponding to the service code. This allows the application provider to recognize execution of the application program, giving an opportunity of determining whether the service is regularly used or not. Twenty-fourth, in the information processing device according to the above-described eighteenth present invention, the following is preferable. The API is an information access API accessible for reading out or writing in disclosure-restricted-information. In this case, regarding the service using information unique to the user or similar information, information safety or similar safety of the service brought by the application program is ensured.

Twenty-fifth, another information processing method according to the present invention is an information processing method for an information processing device included in the above-described system. The method includes the following. A service code and license information regarding an API use request from service are obtained using an application program that uses the API. Registration information is accessed based on a service code and license information regarding the API use request. In the registration information, service identification information, use API information, the service code, license information, and license approval information are associated. The service identification information relates to service. The service identification information is specified from the application provider device. The service code is configured to indicate registration of the service as API use service. The license information is generated corresponding to the user-specific information. The user-specific information is configured to identify an application user specified from the application provider device. The license approval information is configured to indicate an approved/disapproved state of information access authority using the API indicated by the use API information. The use API information is transmitted from the application user device of the application user indicated by the user-specific information corresponding to the license information. With reference to the registration information obtained by the access, an authentication process is performed. The authentication process includes at least confirmation of regular registration with the service code, confirmation of match of API requested for use by the API use request and the use API information, confirmation of validity of the license information, and approval confirmation with the license approval information. The requested API use is permitted according to an authentication result. This information processing method achieves appropriate API use where the information safety is ensured. Twenty-sixth, another program according to the present invention is a program that causes an information processing device to perform a process to be performed as the above-described information processing method. Twenty-seventh, another storage medium according to the present invention is a storage medium that stores the above-described program. These program and storage medium achieve the above-described information processing device.

Advantageous Effects of Invention

According to the present invention, the following is achieved. Regarding the application program involving the API use, the service code allows clearly describing the regular registration. The license information specifies the application user. Moreover, the license information can manage the application user in the configuration of giving the license approval. Accordingly, the information processing device side can manage the application provider with the service code. Additionally, the information processing device side can obtain the registration information in a state where the application user can be managed with the license information. With the license information, the service execution can be approved after the application user recognizes the service. Accordingly, an active opportunity of determining the use of service by the application provider is provided.

With the present invention, at the service execution by the application program, the above-described authentication using the registration information is performed. When the authentication is passed, the API use is permitted. Accordingly, the API is used within a use range of the regular application program and within a license approval range of the application user. Accordingly, the API use in the service falls within the range assumed by the application user, thus ensuring safety of information accessed using the API.

BRIEF DESCRIPTION OF THE DRAWINGS

FIG. 19 is an explanatory view of result information of the embodiment.

DESCRIPTION OF EMBODIMENTS

Figure 1:
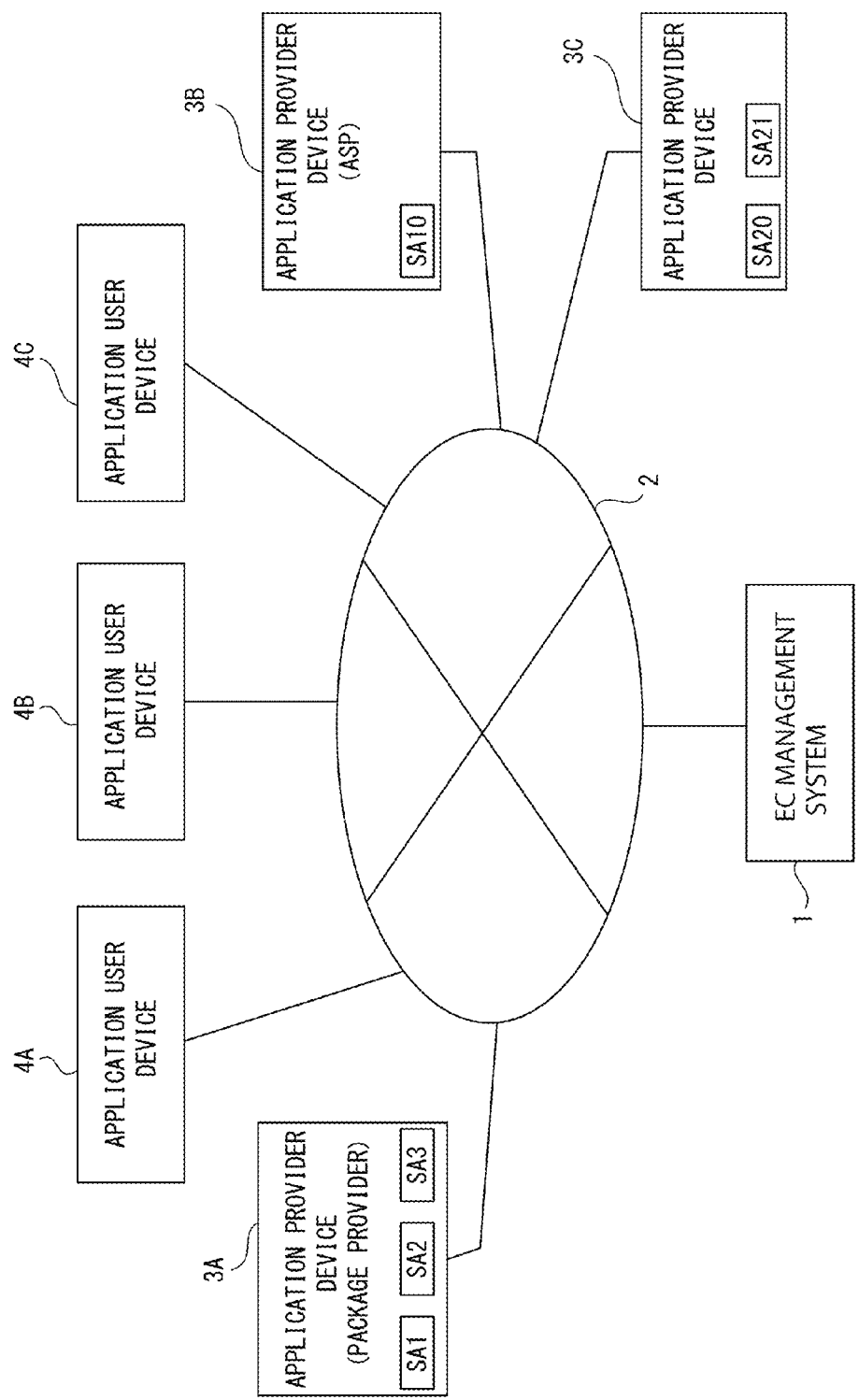
FIG. 1 is an explanatory view of a network system of an embodiment of the present invention.

The following describes embodiments in the order listed below.
1. Network System Configuration
2. EC Management System
3. Process at Registration
4. Exemplary Process I at Service Execution 5. Exemplary Process II at Service Execution
6. Exemplary Process III at Service Execution
7. Exemplary Process IV at Service Execution
8. Effect Brought by Implementation of EC Management System
9. Program and Storage Medium
10. Modification 1. Network System Configuration FIG. 1 illustrates an exemplary network system. This network system functions as an electronic commerce (EC) system. An EC management system 1 in FIG. 1 corresponds to an information processing device of an embodiment of the present invention. In the network system, the EC management system 1, application provider devices 3A, 3B, 3C . . . , application user devices 4A, 4B, 4C . . . are constituted so as to be communicable with one another over a network 2. Unless otherwise especially distinguished, the application provider devices 3A, 3B . . . are generally referred to as an "application provider device 3." Similarly, unless otherwise especially distinguished, the application user devices 4A, 4B, 4C . . . are generally referred to as an "application user device 4." Further, the "application provider device" and the "application user device" are simply abbreviated as a "provider device" and a "user device", respectively.

In this network system, various APIs are availably provided to the EC management system 1. A plurality of respective application providers provide service applications using this preliminary prepared APIs. This allows a plurality of respective application users to use a network service (for explanation, also simply referred to as "service") by execution of an application program available for them. The "service" means service achieved by the service application as one title.

The provider device 3 is an information processing device as a network terminal used by the application provider. The application provider means an individual and a group who provides the service application, which is a program for achieving the service. The application provider, for example, is a software developer/vendor who develops or sells the service application and a dealer who provides the service in the form of the service application such as cloud service. In the drawing, the provider device 3A is an information processing device used by a package provider as a service application. This package provider is a group or an individual who, for example, provides download service of respective programs as a plurality of service applications SA1, SA2, and SA3, sells and grants the service application in the form of an optical disk and other package media, or performing a similar action. The provider device 3B is an information processing device used by the group or the individual. The provider device 3B executes a possessing service application SA10 according to a request by the application user or a similar case and provides service to the application user in the form of cloud services. For example, a so-called Application Service Provider (ASP) corresponds to the application provider in this case. The ASP executes the service application to provide the service to a customer (application user) through the Internet. The provider device 3C is an information processing device used by the application provider. The application provider provides respective programs as a plurality of service applications SA20 and SA21. Thus, when the plurality of respective application providers provide one or a plurality of service applications, the network system of the embodiment can obtain a situation where the plurality of service applications are provided. The service application is a program using the API, which is preliminary prepared by the EC management system 1. FIG. 1 illustrates a case where the plurality of application providers are present. However, there may be an aspect where a single application provider provides the plurality of service applications.

The user device 4 is an information processing device as a network terminal used by the application user. The application user corresponds to a customer for the application provider. The application user, for example, is a person who sells goods over the network at a store (goods distributor). The store, for example, is an electronic store through a website or an actual store. The drawing illustrates the user devices 4A, 4B, and 4C as the information processing devices for different distributors. The application user uses service, such as stock control service and sales management service, with the service application provided by the provider device 3. This allows achieving efficient sales task or a similar effect. The application user is not limited to the distributor, but a variety of groups and individuals who use the service from a certain service application is assumed. The distributor is one example. One or the plurality of application providers provide the plurality of service applications. This allows the respective application users to use a service application that the respective application users need among the plurality of service applications and to use the service by the service application.

In the embodiment, the EC management system 1 is an information processing device that performs the following functions in this network system achieving the electronic commerce system.

Provision of the API used by the service application

Process on registration of the service application that uses the API

Process on authentication at execution of the service application

Process on management of an API use result in association with execution of the service application The following describes the details of these functions. The EC management system 1 includes a constitution required to perform these processes. The EC management system 1 may also serve as a manager of the electronic commerce system. The EC management system 1, for example, may have functions to open an electronic store for the application user and to service of a provision of an e-marketplace or a similar service.

Various examples are assumed as constitutions of the network 2. The constitution, for example, is the Internet, an intranet, an extranet, a Local Area Network (LAN), a Community Antenna TeleVision (CATV) communications network, a Virtual Private Network, a telephone network, a mobile communications network, a satellite communications network, or a similar network. Various examples are also assumed as transmission medium constituting all or a part of the network 2. The transmission medium, for example, can be a wire such as an Institute of Electrical and Electronics Engineers (IEEE) 1394, a Universal Serial Bus (USB), a power-line carrier, a telephone line; and also a wireless such as infrared light like Infrared Data Association (IrDA), Bluetooth (registered trademark), 802.11 wireless, a mobile telephone network, a satellite channel, and a digital terrestrial broadcasting network.

The above-described FIG. 1 illustrates only the information processing device (network terminal) directly related to operations of this embodiment, which will be described later. Practically, other various information processing devices are also related to the network system of this example. The other various information processing devices, for example, are an information processing device for general users, an information processing device for API developers, and an information processing device for API managers. The information processing device for general users purchases goods from a store as the application user through the network 2. The information processing device for API developers is provided with the EC management system 1. The information processing device for API managers approves, manages, or maintains the API, or performing a similar operation.

Figure 2:
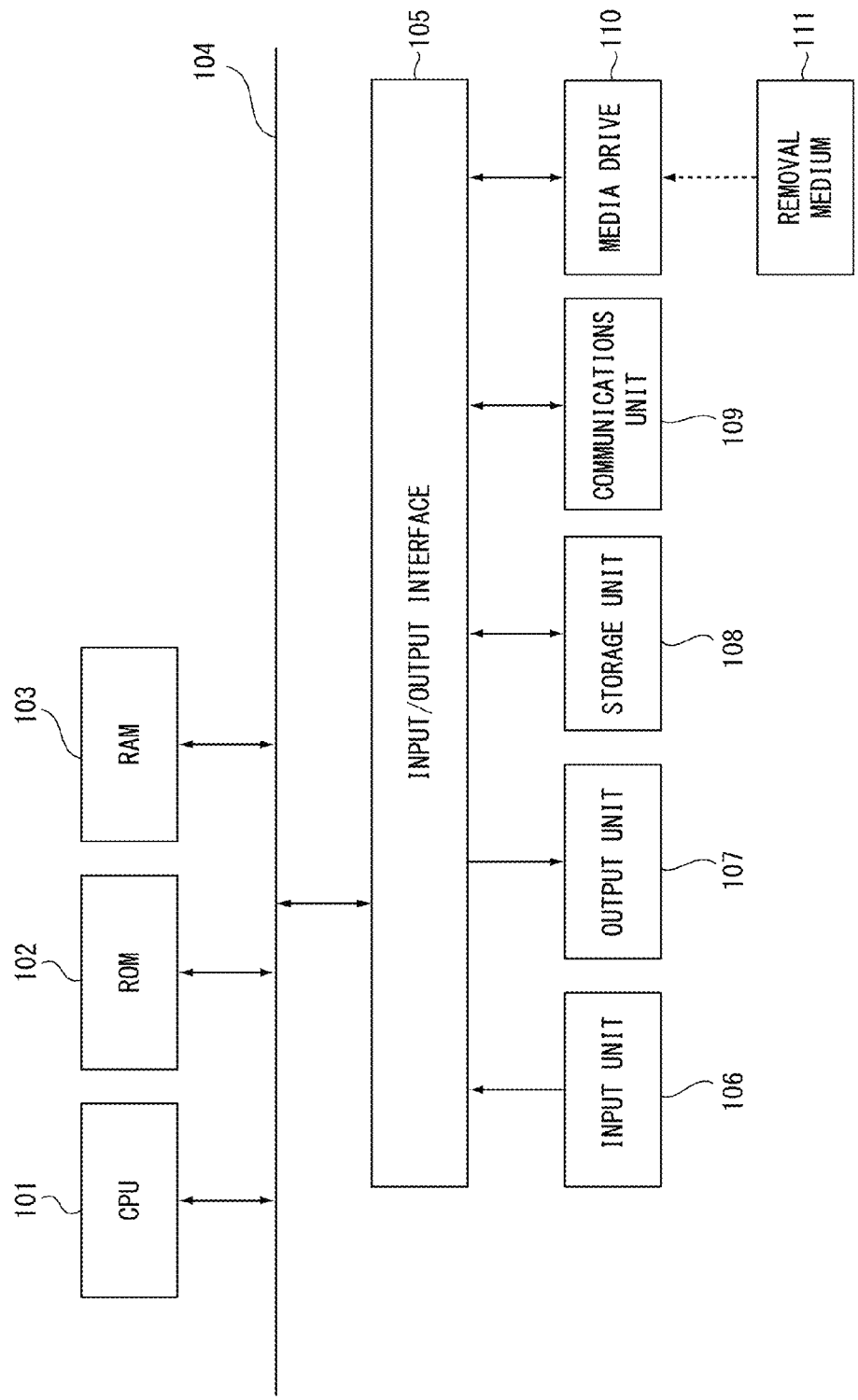
FIG. 2 is a block diagram of a computer device of the embodiment.

Subsequently, FIG. 2 illustrates a hardware constitution of the information processing device constituting the EC management system 1, the provider device 3, and the user device 4, which are illustrated in FIG. 1. The respective devices of the EC management system 1, the provider device 3, the user device 4, or a similar device can be achieved as a computer device as illustrated in FIG. 2. Such computer device can perform information processing and information communications.

In FIG. 2, a Central Processing Unit (CPU) 101 of the computer device performs various processes in association with a program stored in a Read Only Memory (ROM) 102 or a program loaded from a storage unit 108 to a Random Access Memory (RAM) 103. The RAM 103 also appropriately stores data required for the CPU 101 to perform the various processes or similar data. The CPU 101, the ROM 102, and the RAM 103 are mutually coupled via a bus 104. An input/output interface 105 is also coupled to this bus 104. To the input/output interface 105, an input unit 106, an output unit 107, the storage unit 108, and a communications unit 109 are coupled. The input unit 106 is formed of a keyboard, a computer mouse, a touchscreen, or a similar unit. The output unit 107 is formed of a display formed of a Liquid Crystal Display (LCD), a Cathode Ray Tube (CRT), an organic Electroluminescence (EL) panel, or a similar unit; and a speaker or a similar unit. The storage unit 108 is constituted of a Hard Disk Drive (HDD), a flash memory device, or a similar device. The communications unit 109 performs a communications process and communications between devices over the network 2. Additionally, a media drive 110 is coupled to the input/output interfaces 105 as necessary. A removal medium 111, such as a magnetic disk, an optical disk, a magneto-optical disk, or a semiconductor memory, is appropriately mounted. Thus, information is written to and read from the removal medium 111.

Such computer device uploads and downloads data and a program through communications with the communications unit 109 and can exchange data and a program via the removal medium 111. Process operations based on various programs by the CPU 101 performs information processing and communications, which are described later, by the respective EC management system 1, provider device 3, and user device 4. The information processing device constituting the EC management system 1, the provider device 3, and the user device 4 is not limited to the constitution of the single computer device as illustrated in FIG. 2. The information processing device may be constituted of a plurality of systemized computer devices. The plurality of computer devices may be systemized with a LAN or a similar network or may be remotely disposed with VPN or a similar network using the Internet or a similar medium.

2. EC Management System

Figure 3:
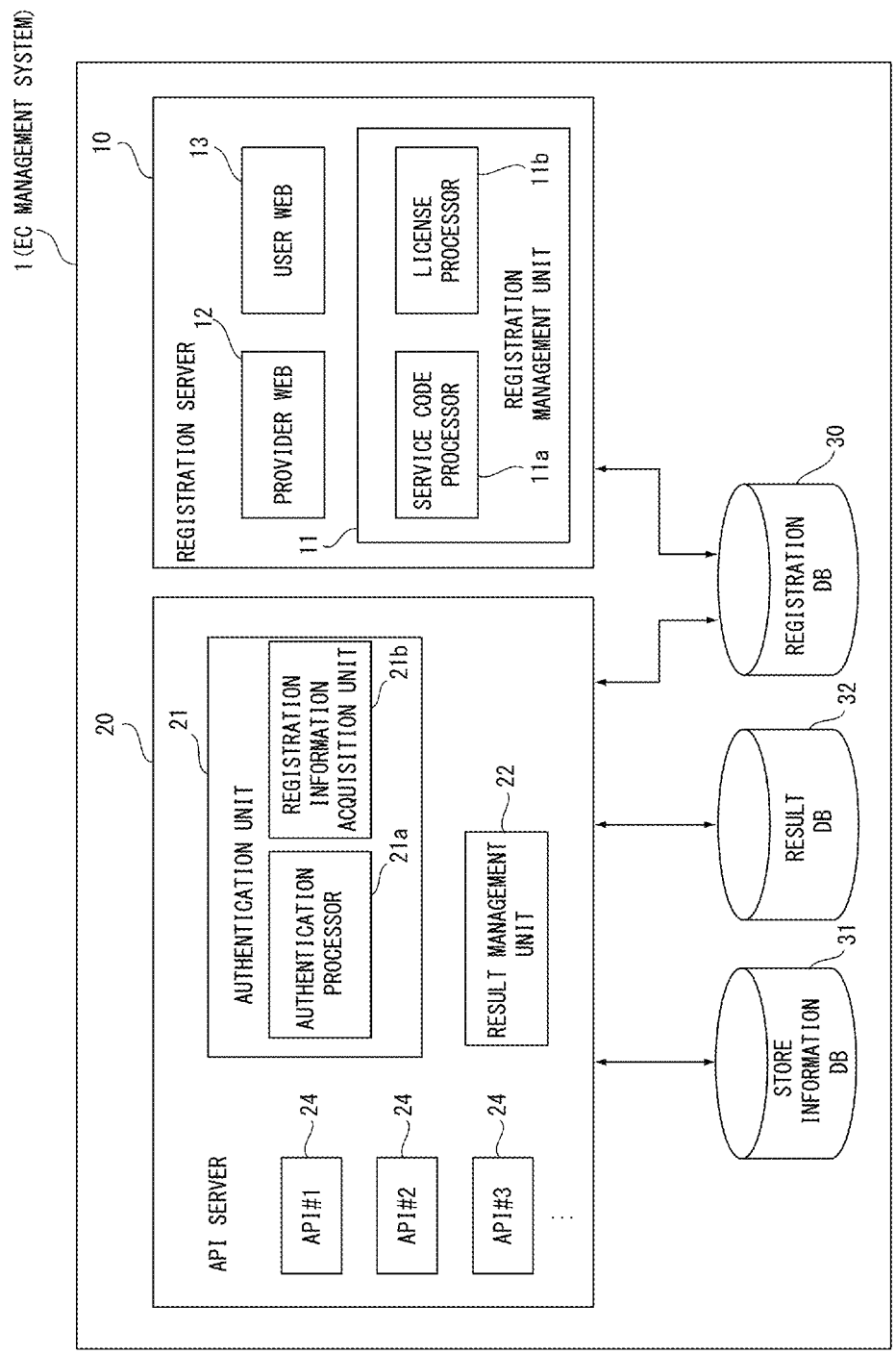
FIG. 3 is a block diagram of an EC system of the embodiment.

For example, the following describes a functional constitution of the EC management system 1 achieved as the above-described computer device with reference to FIG. 3. FIG. 3 is a block diagram illustrating functions required for the operations performed by the EC management system 1 in this embodiment, that is, functions achieved by processes and controls mainly by the CPU 101. The EC management system 1 according to this embodiment includes a registration server 10, an API server 20, a registration database 30, a store information database 31, and a result database 32 as a functional constitution.

The registration server 10 performs a registration process on service achieved by the service application using the API. Accordingly, the registration server 10 includes a registration management unit 11. The registration management unit 11 has functions as a service code processor 11a and a license processor 11b. The service code processor 11a and the license processor 11b are illustrated as a constitution included in the registration management unit 11. The service code processor 11a functions to perform a process on a service code. The license processor 11b functions to perform a process on license information. Actually, individual programs achieve the service code processor 11a and the license processor 11b, or the service code processor 11a and the license processor 11b are achieved as functions executed by a plurality of related programs. Additionally, the service code processor 11a and the license processor 11b can be comprehended as processors that show a process related to the service code and a process related to the license information executed by one program, respectively.

The registration management unit 11 generates a service code in response to an API use registration request transmitted from the provider device 3 with the function as the service code processor 11a. The API use registration request relates to service employing the service application using the API. Regarding the service, the registration management unit 11 also makes service identification information and use API information correspond to the service code and registers the service identification information, the use API information, and the service code with the registration database 30. The service identification information is information for identifying the service application using the API (namely, service using this service application). The service identification information, for example, is a product identification cord, a product name, or similar information of the service application. The use API information is information for identifying an API used by the service application. The use API information, for example, is an identification cord, an API name, or similar information of an API 24, which will be described later. The API server 20 manages the API 24.

The registration management unit 11 generates unapproved license information corresponding to user-specific information on the service transmitted from the provider device 3 with the function as the license processor 11b. The registration management unit 11 also makes the license information correspond to the service code and registers the license information with the registration database 30. The user-specific information is information for identifying the application user who uses the service by the service application. The possible user-specific information is, for example, an ID of the application user, a management cord, identification information of the user device 4, or a Uniform Resource Locator (URL) of a store (website as a store). Such store is opened under management of the EC management system 1 by the application user.

Further, the registration management unit 11 performs license issue notification to the application user with the function as the license processor 11b. The application user is indicated by the user-specific information corresponding to the license information. Upon acceptance of license approval information by the instruction from the user device 4, the registration management unit 11 makes the license approval information correspond to the license information and registers the license approval information and the license information with the registration database 30.

The registration management unit 11 is accessible to the registration database 30 for execution of the registration process. The registration management unit 11 is constituted so as to be communicable with the provider device 3 and the user device 4 through network communications. Further, the registration management unit 11 provides a provider website 12 (hereinafter denoted as a "provider WEB") to input information and show information for registration from the provider device 3. With the functions of the service code processor 11a and the license processor 11b, the registration management unit 11 exchanges the information with the provider device 3 via the provider WEB 12. Additionally, the registration management unit 11 provides a user website 13 (hereinafter denoted as a "user WEB") to input information and show information for registration from the user device 4. With the function of the license processor 11b, the registration management unit 11 exchanges the information with the user device 4 via the user WEB 13.

Here, for practical use, the respective "service code" and the "license information" are assumed to be used with various names, such as an identification cord, a password, a secret cord, key data, key information, a registration cord, an authentication cord, an ID cord, a login cord, and a license cord.

The service code in this embodiment is code information generated and issued by the information processing device as the registration server 10. The service code is issued in response to the API use request, which is transmitted from the provider device 3, on the service employing the service application that uses the API. This service code is generated as unique code data corresponding to individual registered services and at least is made correspond to the service identification information and the use API information. Accordingly, the service code has a function to show regular registration of the service performed by the service application as the API use service. The service code also has a function as a password employed for authentication at execution of the service by the service application. The code data having such functions and properties correspond to the "service code" in this embodiment whatever the name is.

The license information is code data generated in an unapproved state on the service specified with the service code. The license information corresponds to the user-specific information (namely, the application user) specified by the application provider. Moreover, the license information, which is generated corresponding to the application user, has a property that accepts license approval by the instruction from the user device 4 based on an intention of the application user. The information on whether the license is approved/disapproved (or unapproved) is made correspond to the license information as the license approval information. In authentication at execution of the service, the license information is meaningful to confirm an access authority to information to be accessed by the API used in the service. Accordingly, the license information also has a function as the code data. The license information shows that the application user gives an authority of information access in the API to the service application in this service. The code data including such functions and properties corresponds to the "license information" of the embodiment whatever the name is.

Figure 4:
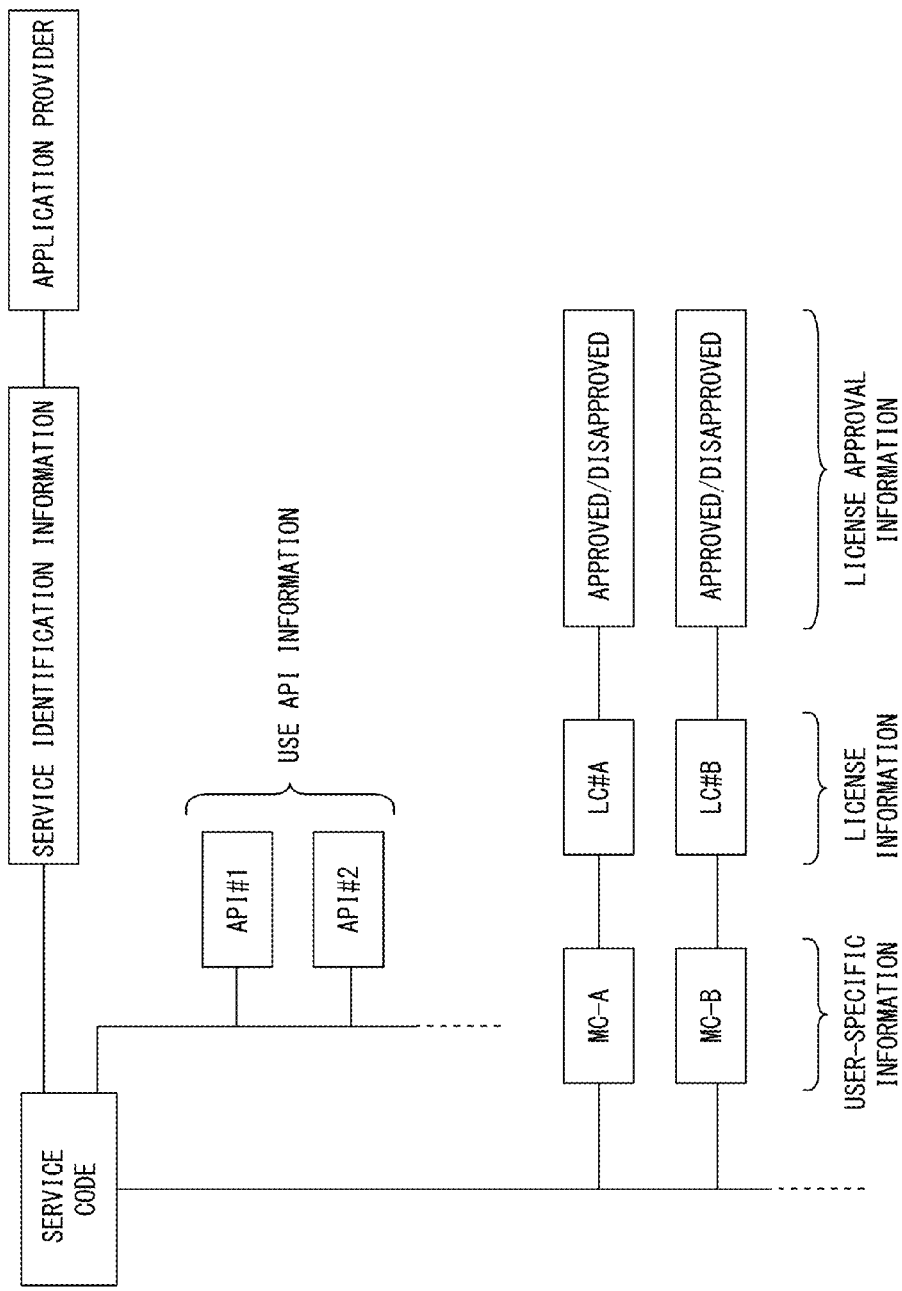
FIG. 4 is an explanatory view of registration information of the embodiment.

With the functions of the registration server 10, the information registered with the registration database 30 has the relationship as illustrated in FIG. 4. FIG. 4 illustrates associated various information from a viewpoint of the service code without consideration of a database format, a link format, a data structure, or a similar condition. The illustrated respective information may be directly associated with one another or may be indirectly associated via another information. The illustrated respective information may be integrated to one database and registered or may be separated to a plurality of databases and registered. One information may include another information. For example, the code data as the service identification information includes information on the application provider. In any format, it is only necessary that the respective information in FIG. 4 can be referred in an associated state as the registration information of this embodiment.

The service code is associated with the service identification information and the information on the application provider. The service identification information is a code indicative of the service itself as described above. For example, one service identification information is provided according to a title as the service application. Specifically, the service identification information is possibly a product name as a service application and information including a product ID or similar information. However, the service identification information may include content information, release date and time information, developer information, or similar information. The content information shows what kind of service is achieved by the application program as a product content. For example, in the case where the version of the service application is upgraded or a similar case, the service identification information different depending on the version may be given. However, consistently, as software with the same title, the same service identification information may be given. However, in the case where at least the use API information differs due to the version upgrade or a similar situation, giving different service identification information is appropriate. The information on the application provider is information indicative of the individual and the group as the application provider.

One or the plurality of use API information is associated with the service code. The use API information is information indicative of the API used in this service. In the diagram, the two APIs denoted as API#1 and API#2 are associated with the service code. The application provider specifies this use API information at registration.

One or the plurality of user-specific information is associated with the service code. The user-specific information is information indicative of the individual application user. When the application provider specifies one or the plurality of application users at the registration process, user-specific information (MC-A, MC-B), which indicates the application user, is associated with the service code. Further, corresponding to the respective user-specific information, the license information is registered. For example, license information LC#A corresponds to the user-specific information MC-A. License information LC#B corresponds to the user-specific information MC-B. The individual license information (license keys LC#A and LC#B) is issued as unique codes different from one another so as to correspond to the respective application users. For explanation, the license information issued to the individual user-specific information is referred to as a "license key." The license approval information is accompanied with the individual license information (license keys LC#A and LC#B). This license approval information is information that indicates whether the application user has approved a license content or not. The license information is initially issued in a state of: the license approval information="unapproved." Approval by the application user updates the license approval information to "approved." For example, when the application user indicated by the user-specific information MC-A gives approval to the license key LC#A, the license approval information of the license key LC#A becomes "approved." If the application user denies the approval, the license approval information is updated to "disapproved."

As the above-described FIG. 4, the service code and various information are associated. The registration database 30 in FIG. 3 is a conceptually illustrated one or a plurality of databases that can be referred to and updated in a state where such group of information is made correspond. The respective registration information is not always necessary to be collectively saved in the form of one database, but may be separately stored. All or a part of the respective registration information may be saved to the outside of the EC management system 1.

As illustrated in FIG. 3, the EC management system 1 includes the API server 20. The API server 20 provides various APIs 24 (API#1, API#2, API#3 . . . ) so as to be available. The respective APIs 24 may be developed inside of the EC management system 1 or may be developed by an external developer. The respective APIs 24 themselves may be prepared in the API server 20 or may be prepared at an external information processing device such that the API server 20 can manage the use of the respective APIs 24. The API 24 is an API, for example, for access to various information managed by the API server 20. That is, the use of the API 24 allows the service application to access specific information and refer to and update information.

Here, various information accessible using the API 24 is as follows. The various information, for example, includes inventory information, commodity price information, sales information, and customer information of each store, which is the application user; and statistical information, sales history information, management information, and charging information created for each store by the EC management system 1 side. The EC management system 1 manages and operates the electronic commerce. This information is, for example, information on business for each application user and is disclosure-restricted-information, which is information whose disclosure is desired to be restricted. For example, the following is the disclosure-restricted-information. A staff member at a store A does not assume that another person, such as a staff member at a store B, browses or updates the above-described own information of the store A, or performing a similar operation. Alternatively, the staff member at the store A desires actively secrets the information. The same goes for the store B. The staff member at the store B does not assume browsing of own business information by another person such as a staff member at the store A.

The use of the API 24 by the service application means that the execution of the service application performs browsing, updating, or a similar operation on the disclosure-restricted-information. For example, a certain store A (application user) purchases and introduces the service application for stock control from the application provider and performs stock control. This service application accesses the inventory information of the store A using the API 24. Accordingly, the use of the service application without permission, a leak, a robbery, and impersonation of the service application needs to be prevented. Otherwise, the execution of the service application by another person allows the other person to browse and update the disclosure-restricted-information of the store A, or performing a similar operation. The same goes for another store B. When introducing a certain service application, since the service application accesses the business information on the store B via the API 24, it is necessary that proper use of the service be ensured. Further, even if invalidly used, allowing limiting the damage to the minimum is preferred. Therefore, for execution of the service application, adding an approval and a restriction by the intention of the store A is preferable. Considering this point, in this embodiment, the application user approves on the license information by, which will be described later.

For convenience in explanation, FIG. 3 and other drawings conceptually illustrate a storage site that saves such information accessed by the API 24 (as one example, business information on the respective stores) as the store information database 31. Each information is not always necessary to be collectively saved in the form of a database. Each information may be saved to the outside of the EC management system 1.

The API server 20 includes an authentication unit 21. The authentication unit 21 has a function as an authentication processor 21a and a registration information acquisition unit 21b. The authentication processor 21a has a function to perform the authentication process. The registration information acquisition unit 21b has a function to access the registration database 30 to obtain the registration information used for the authentication. Actually, individual programs achieve the authentication processor 21a and the registration information acquisition unit 21b, or the authentication processor 21a and the registration information acquisition unit 21b are achieved as functions performed by a plurality of related programs. Additionally, the authentication processor 21a and the registration information acquisition unit 21b can be comprehended as processors that show the authentication process and a registration information acquisition process performed by one program, respectively.

For example, in the case where the user device 4 executes the service application and the API use request is performed on the API server 20, the authentication unit 21 performs authentication on the API use request. Accordingly, the authentication unit 21 obtains the service code and the license information (license key) on the API use request with the function of the authentication processor 21a. At execution of the service, the service code and the license information (license key approved by the application user) are transmitted in association with the API use request, which will be described later. The authentication unit 21 obtains this transmitted service code and license key. The authentication unit 21 accesses the registration database 30 and obtains information required for the authentication with the function as the registration information acquisition unit 21b. Specifically, using the service code and the license information in the API use request, the registration information illustrated in FIG. 4 is obtained. For example, the authentication unit 21 obtains the service identification information corresponding to the service code on this service subject to authentication, the use API information, information on the application provider, the license approval information corresponding to the license information (license key employed this time), or similar information. The authentication unit 21 performs the authentication process including verifications of at least the service code, the use API information, and the license approval information with the function of the authentication processor 21a. Then, the authentication unit 21 performs a process of permitting the requested API use according to the authentication result.

The API server 20 includes a result management unit 22. In the case where the API use is permitted by the authentication process at the authentication unit 21, the result management unit 22 generates result information of the application provider based on the service code in the API use request. Moreover, the result management unit 22 generates the result information of the application user based on the license information. The service code specifies the application provider. Since the user-specific information corresponds to the license information (license key employed this time), the application user can be recognized. Accordingly, regarding the API use result, the result information of the respective application provider and application user can be generated and updated. The result information, for example, is the use API information and the charging information for the API use. The use API information may be information with which the number of API use requests, date and time of use request, use history by the service application, or similar information can be comprehended. Additionally, the use API information may be information with which the number of accesses (the number of reads/the number of updates), date and time, history, or similar information of the actual use of the API can be comprehended. Additionally, this information is possibly history information or similar information of the authentication result of the API use request. As the charging information, various charging information, such as charging information charged according to the API use request, charging information charged according to information access by the API, and charging information set according to a phase of the number of results, is assumed.

For explanation, a site saving the result information of the respective application provider and the respective application user is conceptually illustrated as the result database 32. Various result information is not always necessary to be collectively saved in the form of a database. The result information may be saved to the outside of the EC management system 1.

The information processing device that includes a functional site as the authentication unit 21 and the result management unit 22 may be integrated with the information processing device as the API server 20 or may be constituted as the information processing device separate from the information processing device as the API server 20. Alternatively, the information processing device that includes the authentication unit 21 and the information processing device that includes the result management unit 22 may be separated. Further, the information processing device that includes the functional site as the registration server 10 and the information processing device as the API server 20 may be integrated or may be constituted as separated information processing devices.

3. Process at Registration

As described above, in the network system illustrated in FIG. 1, the application provider provides the service application using the API prepared by the API server 20 to the application user. Thus, the application user uses the service provided by the execution of the provided application program. As an assumption of the execution of this service, this embodiment first requests regular registration of the service (service application) at the EC management system 1. Specifically, issue and registration of the service code, issue and registration of the license information, and further registration of the license approval information on a certain service are performed. The following describes this registration process in detail.

Figure 5:
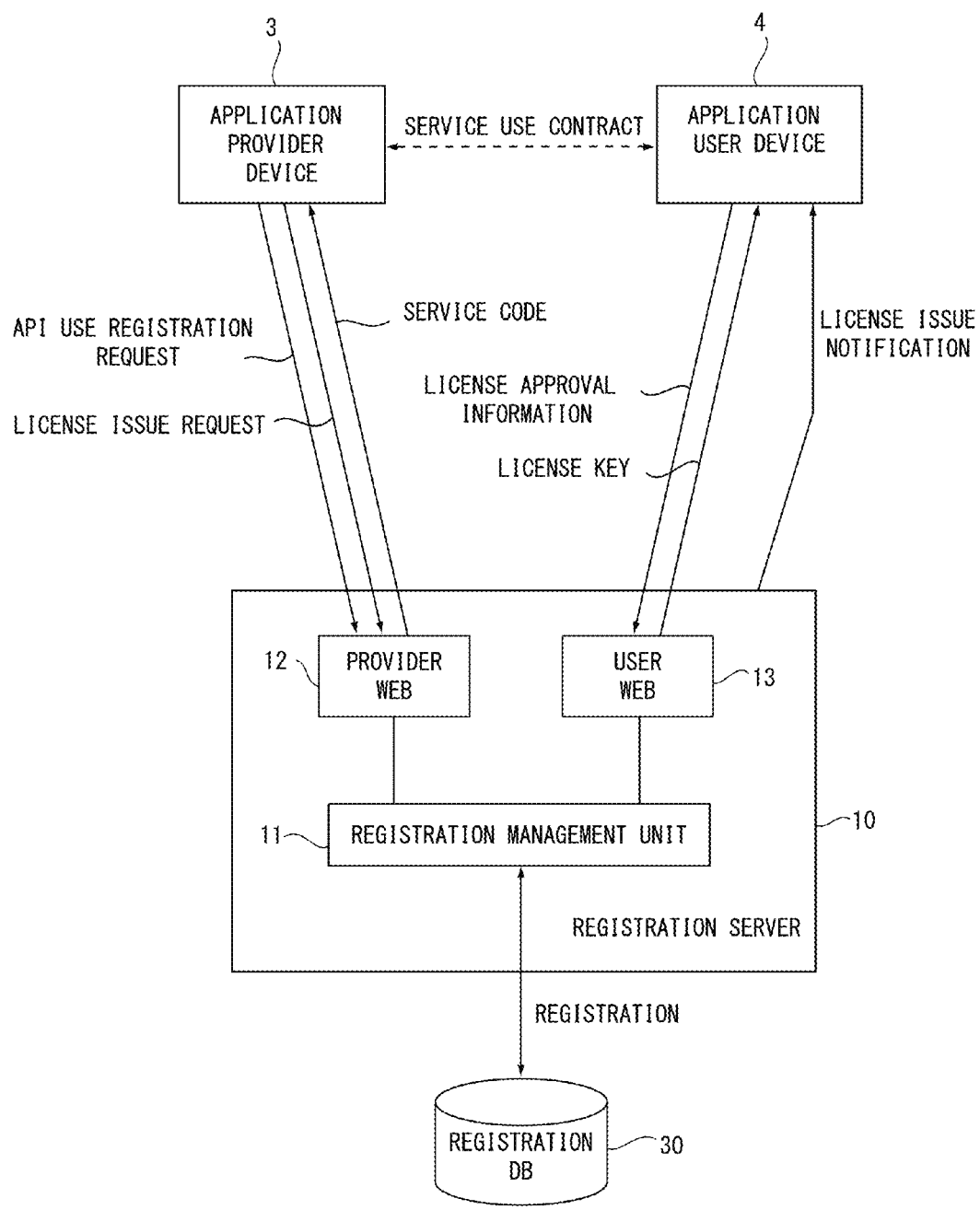
FIG. 5 is an explanatory view of operations at registration of the embodiment.

FIG. 5 schematically illustrates exchange of information for the registration process between related sites. A sequence of registration processes involves the application provider (the provider device 3), the application user (the user device 4), and the registration server 10. The registration information is written and updated to the registration database 30.

Roughly, the registration process is performed in the following procedure of (R1) to (R7).

(R1) The application provider performs the API use registration request (registration request of service using the API) on a certain service (service application) from the provider device 3 to the registration server 10 using the provider WEB 12.

(R2) The registration server 10 generates the service code and issues the service code to the provider device 3. The registration server 10 also registers information on the service with the registration database 30 making the information correspond to the service code.

(R3) The application provider notifies the user-specific information as a license issue request from the provider device 3 to the registration server 10 using the provider WEB 12. As one example, the user-specific information notified in this case is possibly information indicative of the application user planning to use this service with a service use contract with the application provider or a similar contract and the application user to whom the application provider assumes providing the service. Obviously, in response to a request of issuing the license from the application user to the application provider, the application provider may notify the user-specific information indicative of the application user to the registration server 10.

(R4) The registration server 10 issues the license information (license key) making it correspond to the user-specific information, associates the license information and the user-specific information with the service code, and registers the license information and the service code with the registration database 30.

(R5) The registration server 10 performs license issue notification on the application user (user device 4) to whom the license information has been issued.

(R6) The application user confirms the license content from the user device 4 using the user WEB 13. Then, the application user transmits the license approval information in which the approved/disapproved state has been selected to the registration server 10.

(R7) The registration server 10 receives the license approval information based on the intention of the application user. If approved, the registration server 10 transmits the license key, which is a unique code as the license information, to the user device 4. Regardless of approved/disapproved, the registration server 10 makes the license approval information correspond to the license information and registers the license approval information with the registration database 30.

The registration process is as described above. When the license key finally obtains "approved", the registered service becomes executable by the application user who approved the license key.

Figure 6:
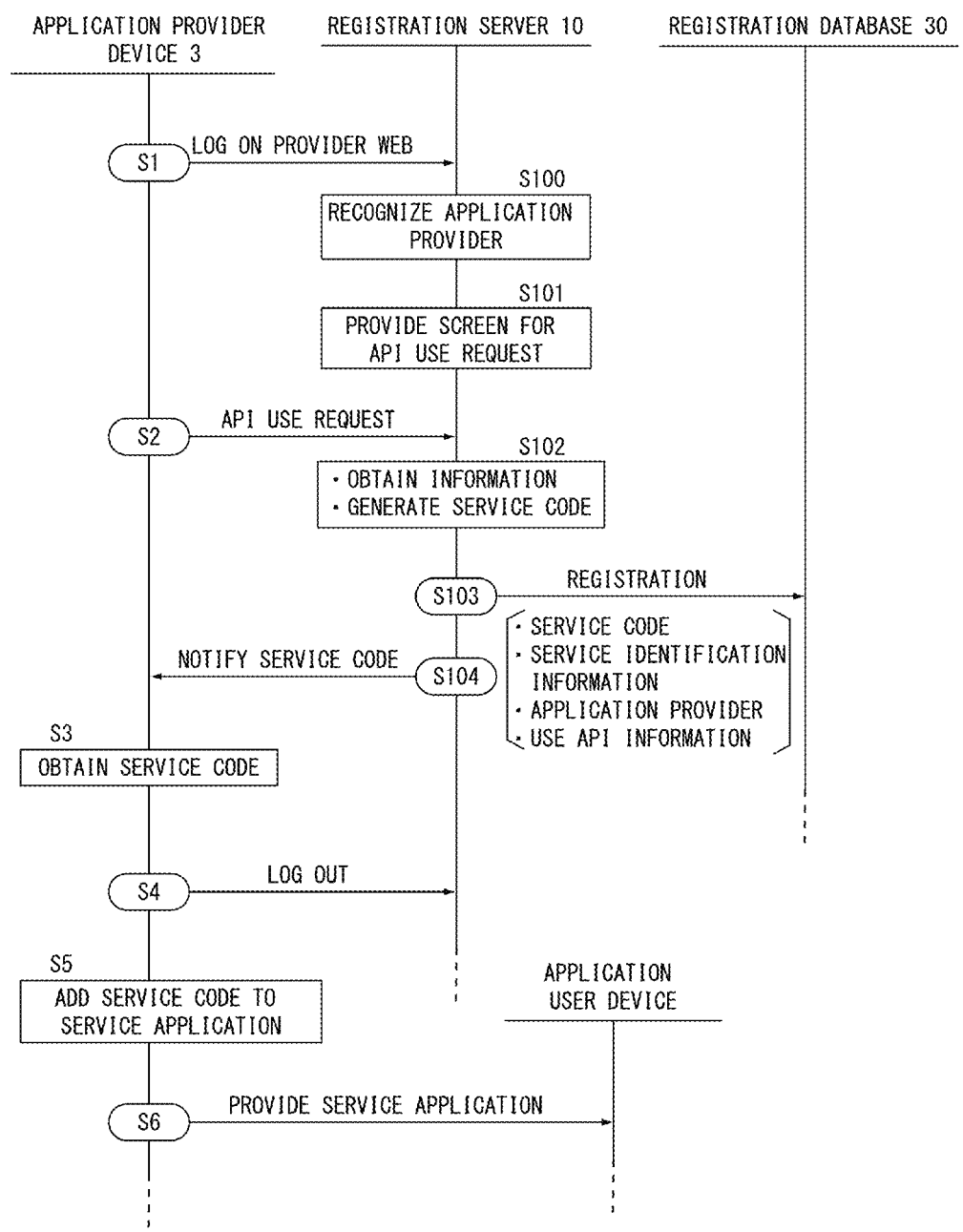
FIG. 6 is an explanatory view of a service code process of the embodiment.
Figure 7:
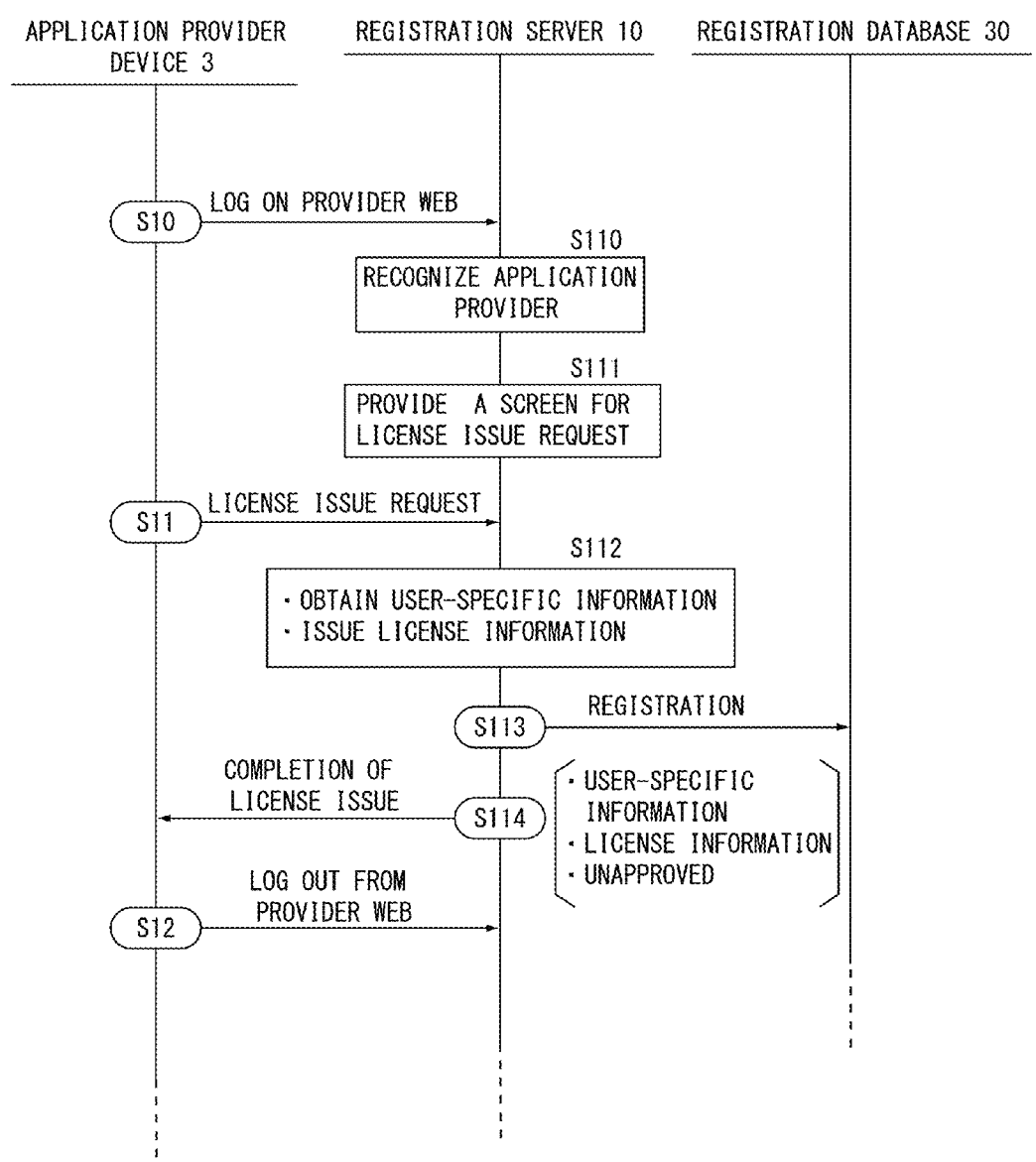
FIG. 7 is an explanatory view of a license process of the embodiment.
Figure 8:
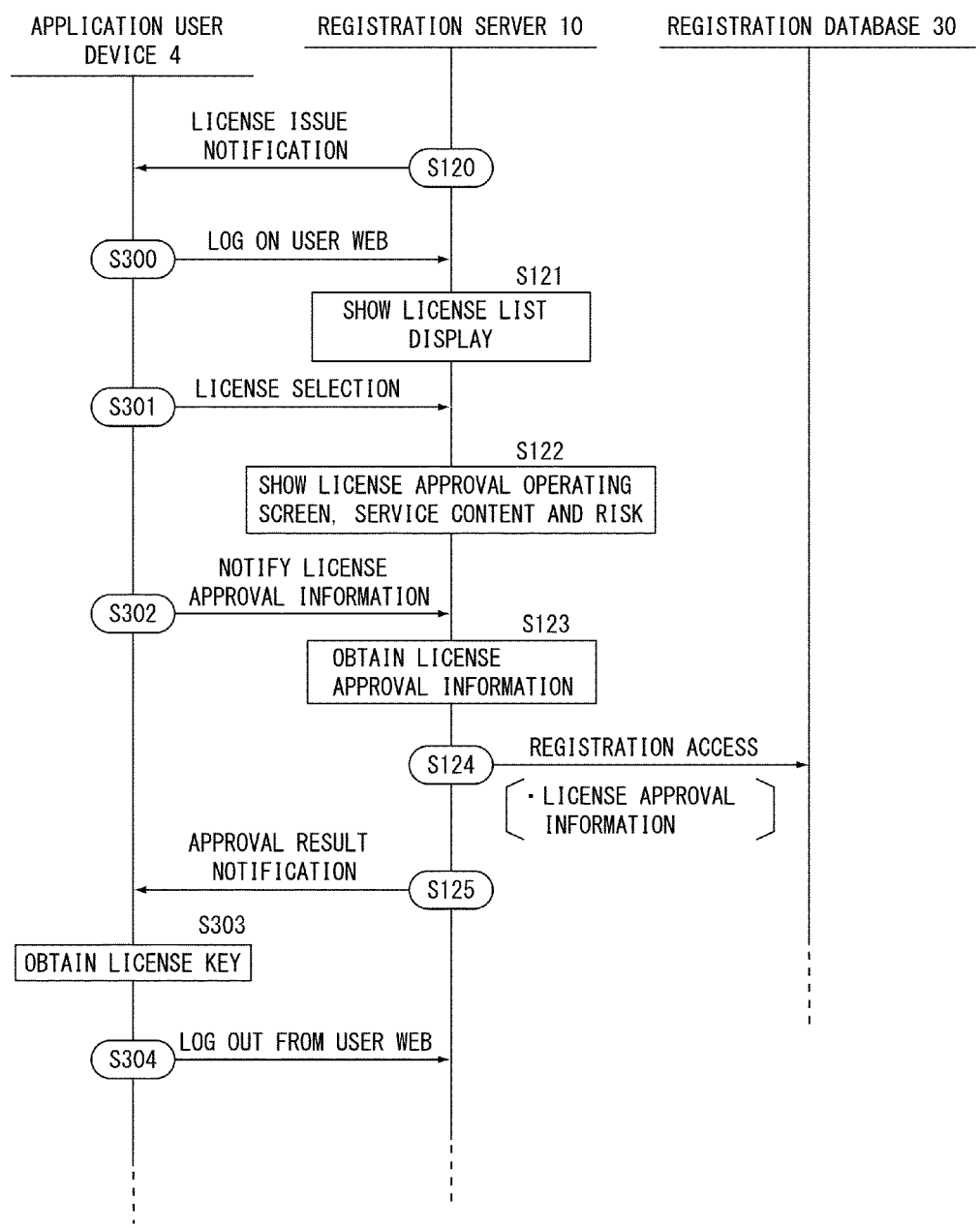
FIG. 8 is an explanatory view of a license approval process of the embodiment.

With reference to FIG. 6 to FIG. 14, the following describes specific process examples of respective units as the registration process. FIG. 6 mainly illustrates the processes by the provider device 3 and the registration server 10. The processes of the registration server 10 illustrated in FIG. 6 to FIG. 8 are processes performed by the registration server 10 using the functions of the service code processor 11*a* and the license processor 11*b*, which are described in FIG. 3, and using the provider WEB 12 and the user WEB 13.

The application provider who provides the service application that achieves a certain service (for example, grant and lending) first accesses the provider WEB 12, which is prepared by the registration server 10, using the provider device 3 for registration of the service. As Step S1, the provider device 3 logs on the provider WEB 12 using a login password, a user ID, or similar information given to the application provider.

Figure 9:
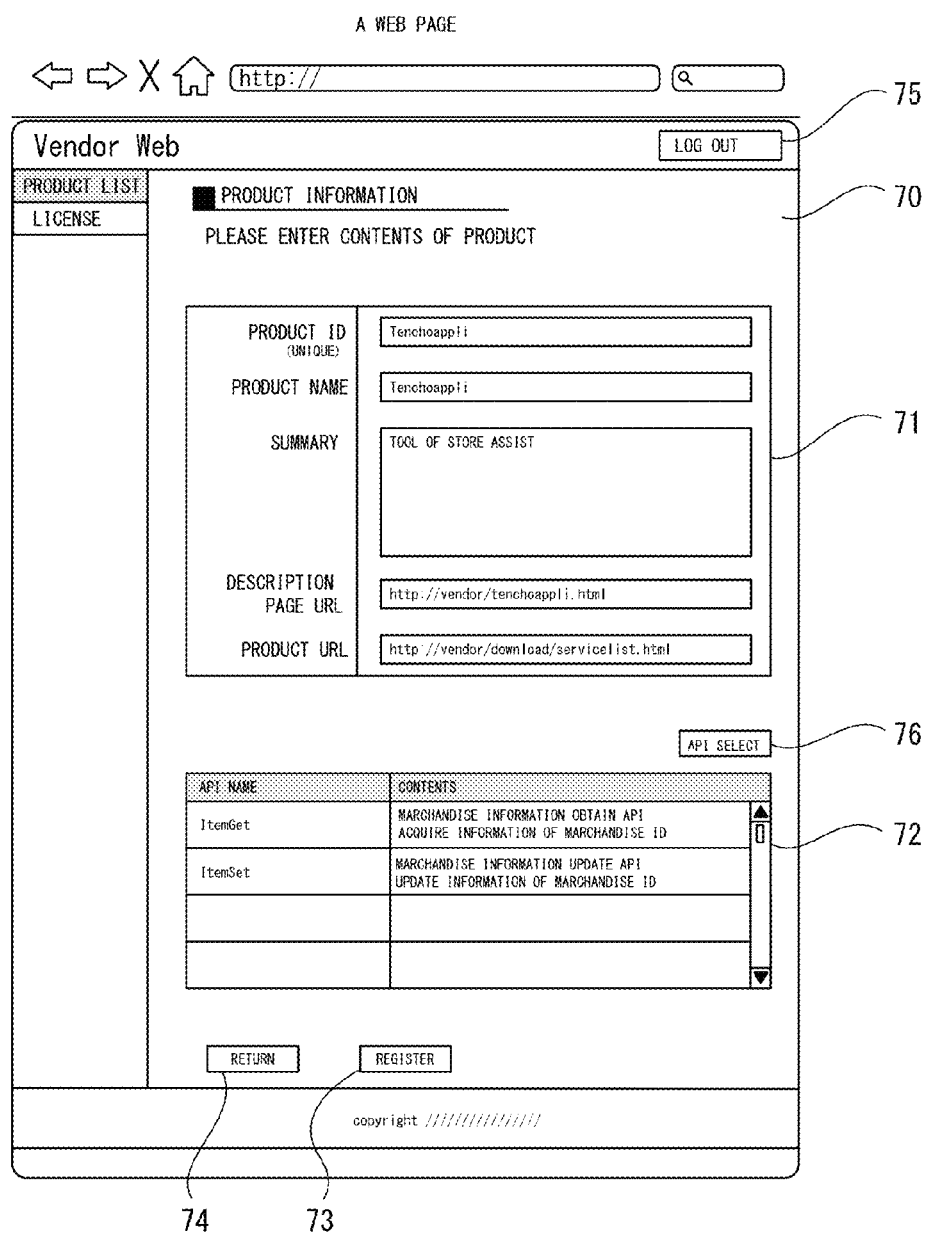
FIG. 9 is an explanatory view of an input screen for an API use registration request on a provider WEB of the embodiment.

The registration server 10 recognizes the application provider by the login at Step S100. For example, in response to a request operation on the web from the provider device 3 side, the registration server 10 provides a screen (web page) for the API use registration request on the provider WEB 12 at Step S101. FIG. 9 illustrates an exemplary API use registration screen 70 provided on the provider WEB 12. On this API use registration screen 70, for an input and an operation by the application provider, a product information input portion 71, a use API input portion 72, a registration operating portion 73, an undo operating portion 74, a logout operating portion 75, an API selection operating portion 76, or a similar portion are prepared. On the product information input portion 71, a product ID as the provided service application, a product name, an outline (outline of the service content), a description page URL, a product URL, and similar information can be input. On the use API input portion 72, the API used by this service application can be input. For example, the API selection operating portion 76 is operated to display an API list. From the list, an API can be selected. According to the selection, the API name and the process content are entered to the use API input portion 72.

The application provider operates the API use registration screen 70 from the provider device 3 to perform the API use registration request. Specifically, the application provider uses the provider device 3 to browse the API use registration screen 70 and inputs a required item. For example, as illustrated in FIG. 9, in the state where the product information input portion 71 and the use API input portion 72 are input, the registration operating portion 73 is operated (clicked). In view of this, as Step S2, the provider device 3 transmits the API use registration request based on the input content to the registration server 10.

Upon the API use registration request, the registration server 10 obtains information related to the API use registration request at Step S102. That is, all or a part of the information input to the product information input portion 71 of the API use registration screen 70 is obtained as an identification information of the service application (service identification information). In the case of obtaining a part of the information, for example, the product ID, the product name, and the outline are included in the service identification information. The registration server 10 obtains the information on the respective APIs input to the use API input portion 72 of the API use registration screen 70 as the use API information. Further, the registration server 10 generates the service code, which is a unique code, in response to one API use registration request.

Figure 10:
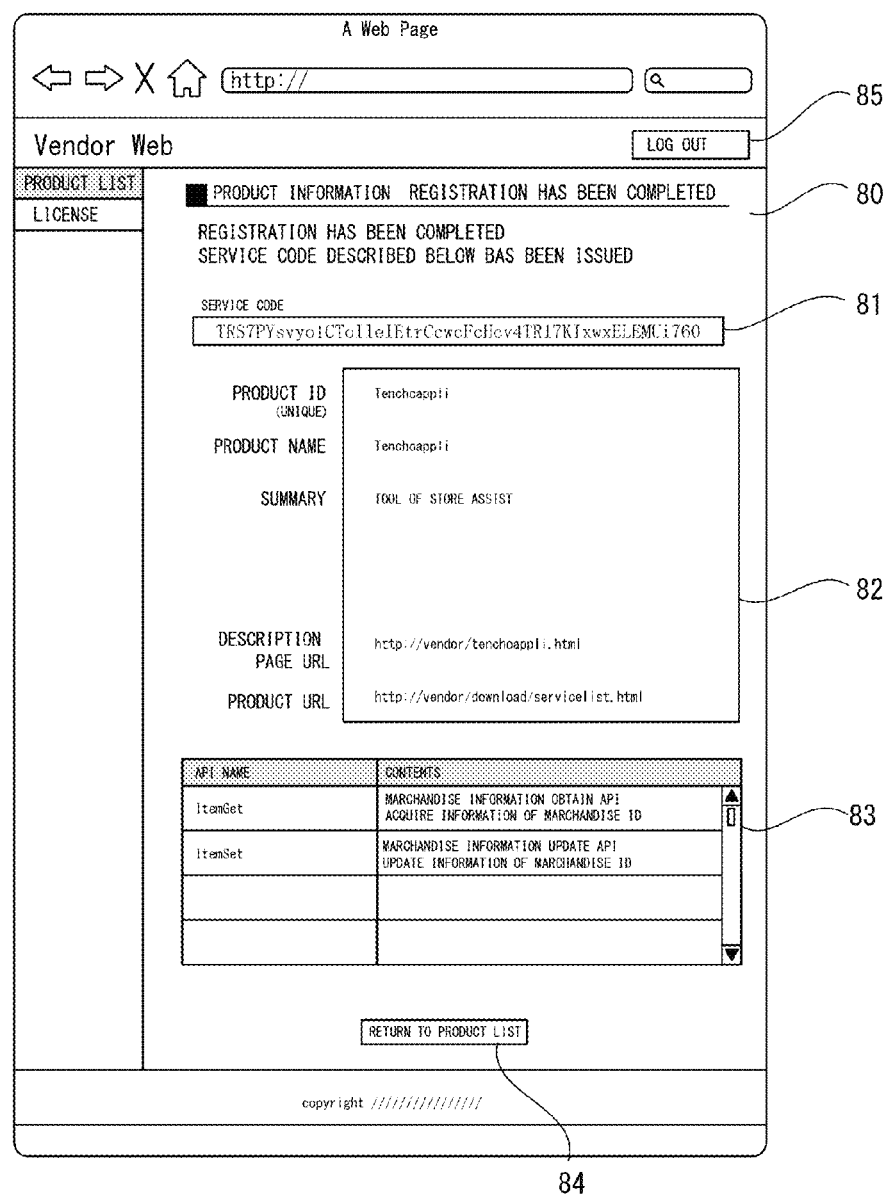
FIG. 10 is an explanatory view of a service code issue screen on the provider WEB of the embodiment.

Subsequently, the registration server 10 performs registration to the registration database 30 at Step S103. At this point, the registration server 10 registers the service identification information and the use API information, which are obtained at Step S102, and the information on the application provider recognized at Step S100 making them associated with one another and correspond to the generated service code. The registration server 10 notifies the service code to the provider device 3 at Step S104. For example, on the provider WEB 12, for example, a registration completion screen 80 as illustrated in FIG. 10 is shown. The registration completion screen 80 displays a service code showing portion 81, a service content showing portion 82, a use API showing portion 83, an undo operating portion 84, a logout operating portion 85, and a similar portion. The service code showing portion 81 displays the service code, which is a unique code formed of, for example, around several tens of digits. The service content showing portion 82 displays the content of the service application (content of the service identification information) registered corresponding to this service code. The use API showing portion 83 displays the API registered for use by this service application.

By browsing this registration completion screen 80, the application provider can confirm completion of appropriate registration on the service. At Step S3, the provider device 3 obtains the shown service code. Now the exchange with the registration server 10 is completed. Therefore, the provider device 3 logs out from the provider WEB 12 at Step S4. However, the provider device 3 may not log out but may proceed to the process on the license information, which is described in FIG. 7.

FIG. 6 illustrates the processes by the provider device 3 as Steps S5 and S6. However, this Steps S5 and S6 may not be always performed in the course of this registration process. At Step S5, the provider device 3 adds the service code to the service application. That is, the service code is embedded to the service application, which is a product to be provided, so as to use the service code at the use of the service. At Step S6, the provider device 3 provides the service application to the user device 4. For example, the service application to which embedding of the service code has been completed is download to the user device 4. Alternatively, if the application provider is a dealer as the ASP, it is only necessary to notify the usable state of the service application to the application user. These Steps S5 and S6 are absolutely performed as a part of business of the application provider. Therefore, it is only necessary that the Steps S5 and S6 are at least performed conveniently after issue of the service code, and the EC management system 1 is not involved.

Figure 11:
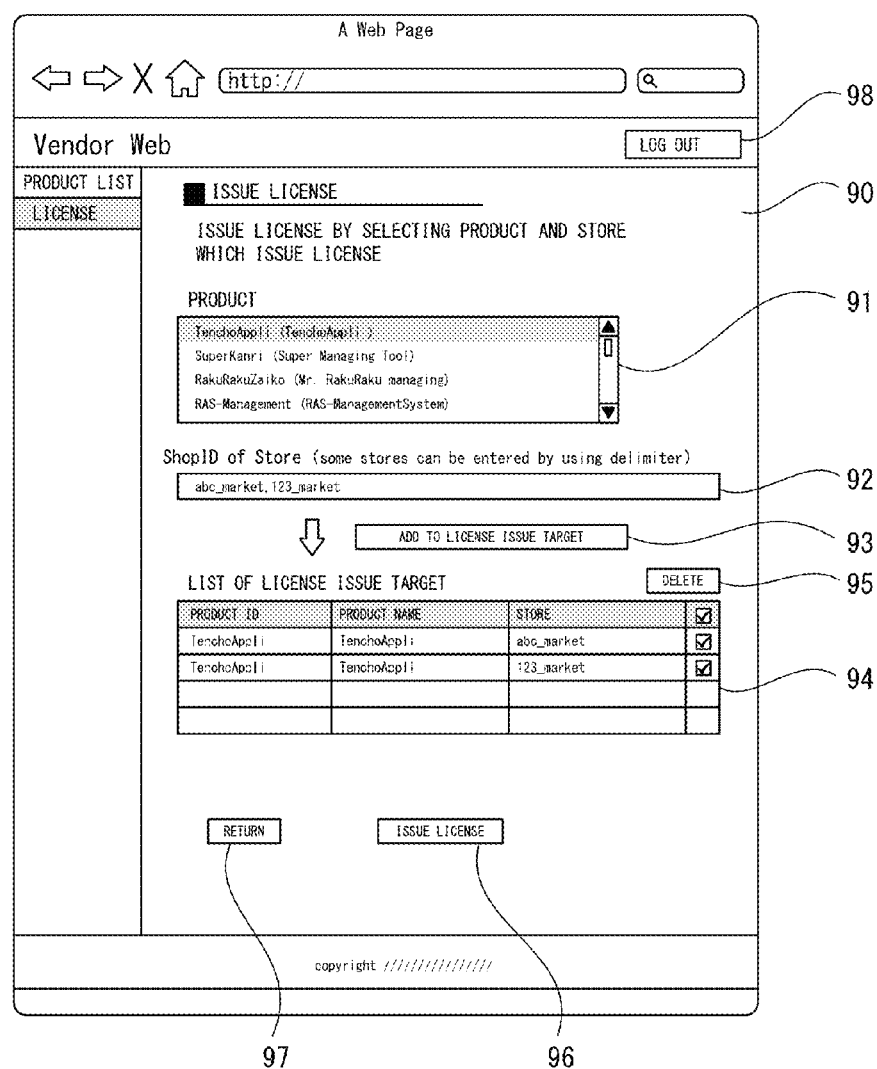
FIG. 11 is an explanatory view of a license issue screen on the provider WEB of the embodiment.

Subsequently, the application provider requests the registration server 10 to issue the license information. As Step S10 in FIG. 7, the provider device 3 logs on the provider WEB 12 using the login password, the user ID or similar information given to the application provider. By the login, the registration server 10 recognizes the application provider at Step S110. For example, in response to the request operation on the web from the provider device 3 side, the registration server 10 provides a screen for issuing the license (web page) on the provider WEB 12 at Step S111. FIG. 11 illustrates an exemplary license issue screen 90 provided on the provider WEB 12. This license issue screen 90 displays a product list display portion 91, a store specification portion 92, an additional operating portion 93, a license issue target list 94, a deletion operating portion 95, a license issue operating portion 96, an undo operating portion 97, a logout operating portion 98, and a similar portion.

The registration server 10 displays a list of the service applications registered as products of the application provider logged on this time on the product list display portion 91. The store specification portion 92 allows an input for specifying a shop as the application user. For example, the shop can be specified with an ID given to the shop (hereinafter referred to as a "shop ID") managed by the EC management system 1, an e-mail address of the shop, or other information with which the shop and a contact address of the shop can be specified. The license issue target list 94 can list the application providers (stores) to whom licenses of certain service applications indicated by, for example, the product ID and the product name, are to be issued.

The application provider operates the license issue screen 90 from the provider device 3 to perform the license issue request. Specifically, the application provider browses the license issue screen 90 using the provider device 3 and inputs a required item. First, the application provider confirms a list of own products on the product list display portion 91 and selects a product to which the license issue request is performed this time. The application provider inputs information for identifying one or a plurality of stores (application users) to the store specification portion 92. Then, the application provider operates the additional operating portion 93. Accordingly, the application user who inputs information on the specified product (service application) to the store specification portion 92 is added to the license issue target list 94 as a license issue target. Even after the application user is once shown in the license issue target list 94, the application user can be removed from the list using the deletion operating portion 95. The application provider may specify, for example, a store with which a service provision has been already contracted, a store expected to use the service, or a similar store at the store specification portion 92 such that the store is entered in the license issue target list 94.

The application provider enters the required license issue target to the license issue target list 94 and then operates the license issue operating portion 96. This transmits the license issue request based on the input content from the provider device 3 to the registration server 10 at Step S11.

When the license issue request is performed, the registration server 10 obtains information on the license issue request at Step S112. That is, based on the information entered in the license issue target list 94 of the license issue screen 90, the user-specific information, which identifies the user who requested the license issue to the service application, is obtained. For example, the shop ID is retrieved as the user-specific information. The registration server 10 issues the license information (license keys) to one or the plurality of respective user-specific information.

Then, the registration server 10 performs registration on the registration database 30 at Step S113. In this case, the registration server 10 makes the service application related to the request at this time correspond to the already registered service code and registers a set of one or the plurality of user-specific information and the license information. Note that at this time point, the registration server 10 adds the license approval information indicating "unapproved" regarding the issued license information. At Step S114, the registration server 10 notifies the provider device 3 of completion of the license issue. For example, the provider WEB 12 shows a license issue completion screen. By browsing the license issue completion screen, the application provider can confirm the completion of the license issue to the respective specified application users. Now the exchange with the registration server 10 is completed. Therefore, the provider device 3 logs out from the provider WEB 12 at Step S12.

The above-described processes make the service identification information and the application provider to correspond to the service code as the registration information of the service provided by the application provider. Additionally, regarding this service, the user-specific information of the application user who is assumed to use the service is made correspond to the license information issued to the application user. Note that at this time point, the license approval information indicating "unapproved" is added regarding the license information. After that, the registration server 10 performs the process regarding the license approval with the user device 4.

FIG. 8 illustrates an exemplary process of the user device 4 and the registration server 10 regarding the license approval. When the registration server 10 issues the license as described above, the registration server 10 notifies the user device 4 of the fact of the license issue based on the user-specific information corresponding to the issued license information as Step S120. For example, assume that the EC management system 1 links the shop ID and the e-mail address and manages the data and the shop ID is employed as the user-specific information. In this case, the registration server 10 obtains the e-mail address of the application user from the shop ID and performs the license issue notification addressing the e-mail address. This notification allows the application user to recognize that the new license related to himself/herself is issued.

The application user can access the user WEB 13 using the user device 4 and can perform confirmation and operation regarding the license. The user device 4 logs on the user WEB 13 using the login password, the user ID, or similar information given to the application user as Step S300.

Figure 12:
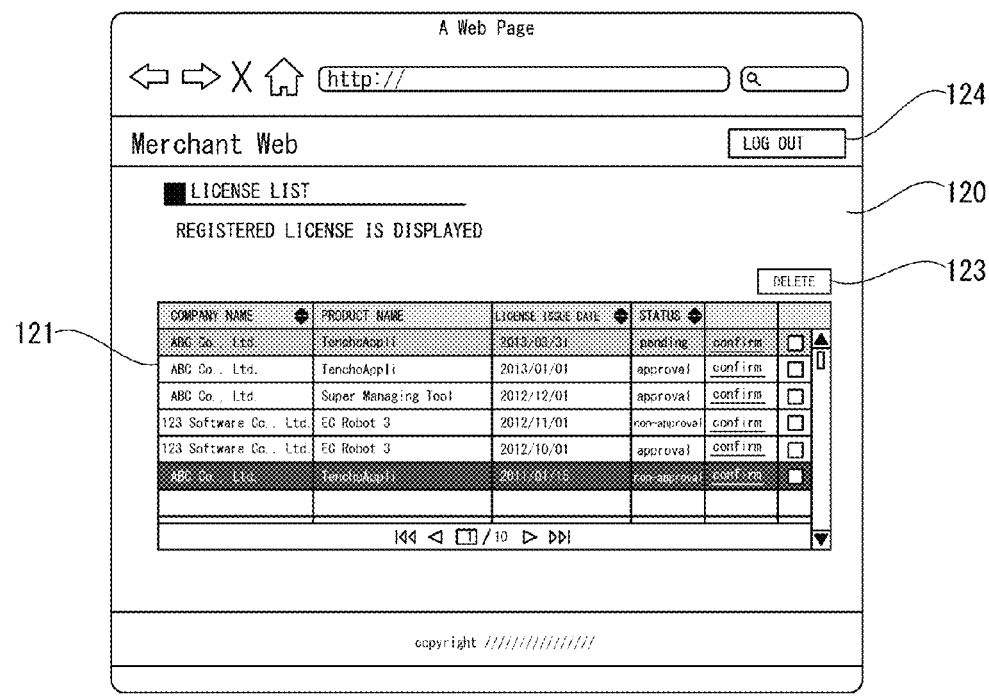
FIG. 12 is an explanatory view of a license list screen on a user WEB of the embodiment.

Upon the login, the registration server 10 recognizes the application user and provides a license list screen regarding the application user on the user WEB 13 at Step S121. FIG. 12 illustrates an exemplary license list screen 120. The license list screen 120 displays a license list display portion 121, a deletion operating portion 123, a logout operating portion 124, and a similar portion. The license list display portion 121 lists the licenses issued on this application user. The license list display portion 121 shows the content of the already issued license information targeting the application user. The license list display portion 121 shows, for example, a company name of the application provider, a product name included in the service identification information, a license issue date, and a state of approved/unapproved. The application user selects the license information for performing the operation regarding the approval in this license list display portion 121. Using the deletion operating portion 123, a specific license can be deleted from the license list.

Figure 13:
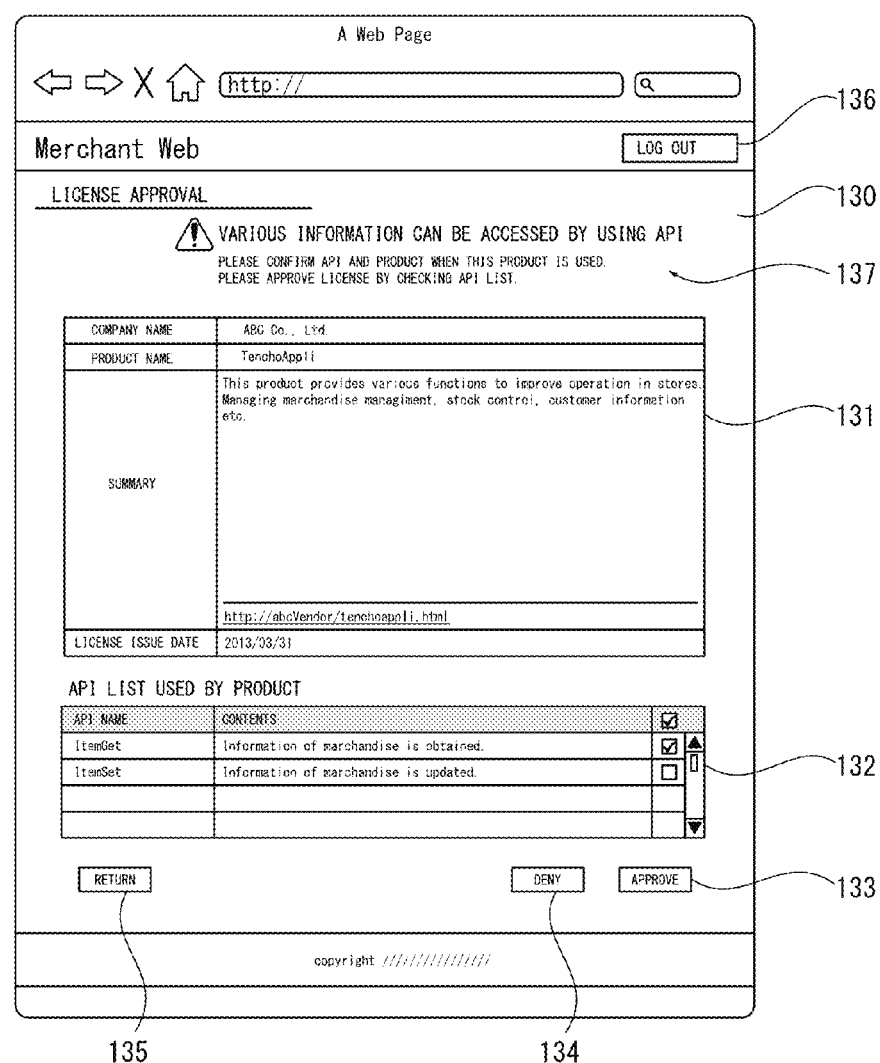
FIG. 13 is an explanatory view of a license content confirmation screen of the user WEB of the embodiment.

The license selection operation by the application user transmits the information on the license selection from the user device 4 to the registration server 10 as Step S301. In response to this, the registration server 10 shows a license approval operating screen 130 as illustrated in FIG. 13 on the user WEB 13 at Step S122. The license approval operating screen 130 displays a product information display portion 131, an API list display portion 132, an approval operating portion 133, an approval denial operating portion 134, an undo operating portion 135, a logout operating portion 136, an attention message 137, and a similar portion.

The product information display portion 131 displays the content of the service related to this license information. The content of the service, for example, is the company name as the application provider, the product name of the service application, the outline of the service content, and a license issue date. This allows the application user to understand that this license is related to what sort of service.

The attention message 137 shows that this service uses the API. The API list display portion 132 shows the actually used API. The information from the attention message 137 and the API list display portion 132 has a meaning as risk information, which indicates a risk in association with the execution of service, for the application user. The API list display portion 132 displays the API name used in this service and the content. The content shows that the respective APIs access what sort of information and whether to obtain the information, update the information, or perform a similar operation or not. This display allows the application user to recognize dangerousness in association with the execution of service, specifically, dangerousness regarding information related to the own store. As the risk information, more specific content of a type and a content of information read or updated using the API or similar information may be shown. For example, the API list display portion 132 may show specific information such as price information, inventory information, client roster information, or similar information accessed using the respective APIs. The API list display portion 132 also may show a concrete example of an information leak in association with the API use or a similar example.

While recognizing the dangerousness accompanied by the API use, the application user can select whether to approve the license information or to deny the approval. As a method for license approval, batch approval and individual approval are considered. The batch approval is a method where the registration server 10 accepts only the approval of license assuming that the application user uses all shown APIs. The individual approval is a method where the registration server 10 permits the license approval of permission of only some APIs use among the shown APIs by the application user.

First, the following describes the case of using the batch approval. The application user can operate the approval operating portion 133 only when the application user confirms the license approval operating screen 130 and assents to the use of all APIs. For example, checkboxes are prepared for the respective APIs as illustrated in the drawing. The approval operating portion 133 becomes active only when the all APIs have been selected. When approving the license information, the application user operates the approval operating portion 133. On the other hand, if not approving considering the dangerousness, the application user operates the approval denial operating portion 134. These operations cause the user device 4 to notify the registration server 10 of the license approval information as Step S302 in FIG. 8.

The registration server 10 obtains the license approval information, which indicates "approved" or "disapproved (approval denied)", at Step S123. At Step S124, the registration server 10 registers the license approval information with the registration database 30 as the license approval information corresponding to the target license information. In this case, when this license information is approved by the batch approval, this means that the application user approves the all API use registered with the use API information in this service.

The following describes the case of using the individual approval. The application user checks the license approval operating screen 130 and selects whether to approve the use of the respective APIs or not. For example, the application user selects some of or all of the checkboxes of the APIs whose use has been assented and then operates the approval operating portion 133. If not permitting the use of all APIs, the application user operates the approval denial operating portion 134. These operations notify the license approval information from the user device 4 to the registration server 10 as Step S302 in FIG. 8.

The registration server 10 obtains the license approval information, which indicates "approved" or "disapproved (approval denied)" of each API, at Step S123. At Step S124, the registration server 10 registers the license approval information with the registration database 30 as the license approval information corresponding to the target license information. In this case, the license approval information is made correspond to the license information. Thus, the registration server 10 registers the approved/disapproved state of the respective APIs listed in the use API information. Setting some APIs to "disapproved" means that the APIs are not used in the service. That is, the application user can restrict a part of the function of the service application.

Figure 14:
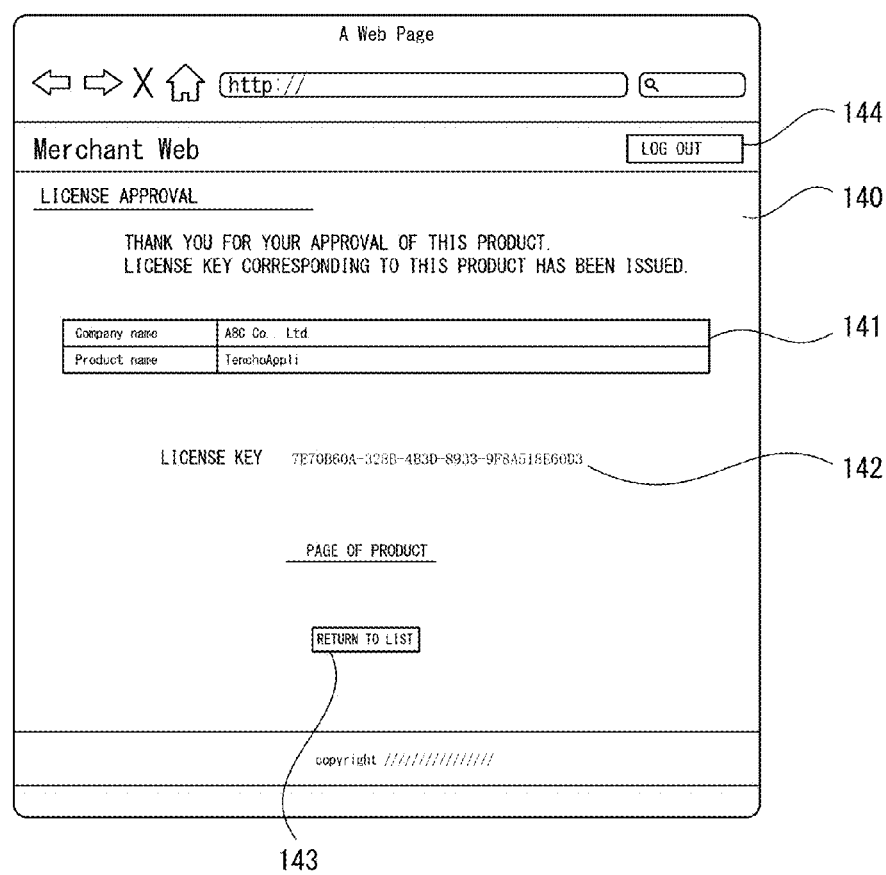
FIG. 14 is an explanatory view of a license approval screen of the user WEB of the embodiment.

After registering the license approval information at Step S124, the registration server 10 performs an approval result notification on the user device 4. For example, if approving the API by the batch approval or if approving some of or all of the APIs by the individual approval, the registration server 10 shows, for example, a license approval result screen 140 as illustrated in FIG. 14 on the provider WEB 12. The license approval result screen 140 displays, for example, a service display portion 141, a license key display portion 142, an undo operating portion 143, and a logout operating portion 144. The service display portion 141 displays the application provider and the product name of the service application. The license key display portion 142 displays the approved license key for the application provider and the product name.

By browsing this license approval result screen 140, the application user can confirm completion of license approval on the service. At Step S303, the user device 4 obtains the shown license key. This license key is saved for subsequent actual use of the service application. Now the exchange with the registration server 10 is completed. Therefore, the user device 4 logs out from the user WEB 13 at Step S304.

When denying the license approval, the registration server 10 shows the result of the license denial (disapproval) on the user WEB 13. Even after once denying, the user device 4 can select the service at the license list display portion 121 illustrated in FIG. 12 again and can approve the license.

The service application registered by the above-described processes of FIG. 6 to FIG. 8 can perform the process using the API afterward. At this time point, the registration information on the service application illustrated in FIG. 4 is formed.

4. Exemplary Process I at Service Execution

The following describes the exemplary process at service execution. The following describes the exemplary process I, exemplary process II, and exemplary process III where the application user is assumed to be a person who uses the provider device 3A illustrated in FIG. 1, that is, a provider who provides a package as an application program to the user device 4 by download or through medium. The exemplary process IV, which will be described later, is assumed that the application user is a person is a dealer as the ASP using the provider device 3B illustrated in FIG. 1.

Figure 15:
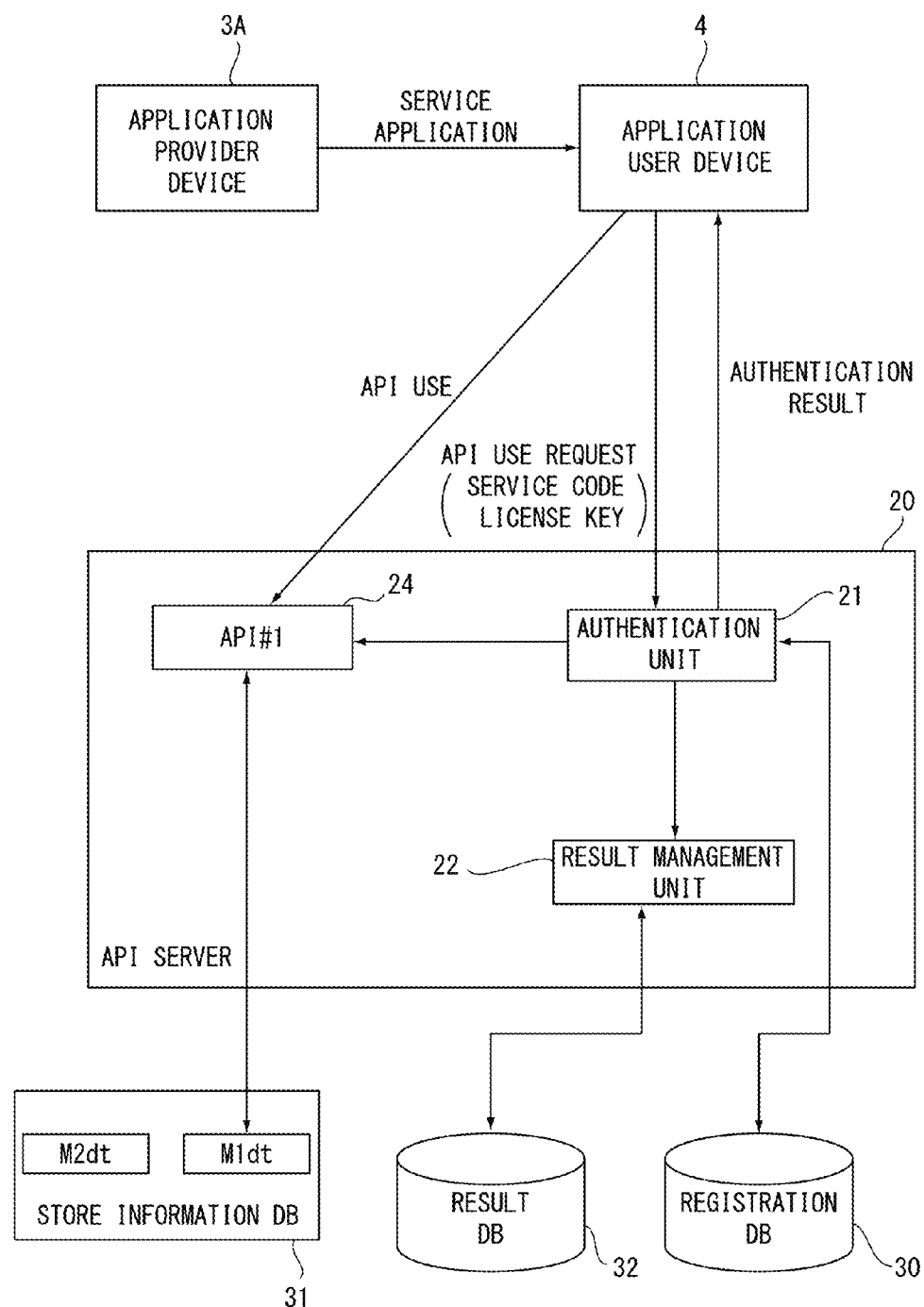
FIG. 15 is an explanatory view of operations at use of service of the embodiment.

First, the following describes the exemplary process I with reference to FIG. 15 to FIG. 18. FIG. 15 schematically illustrates exchange of information on authentication at the execution of service and a process using the API with related sites. In this case, it is assumed that the provider device 3A provides the service application to the user device 4. That is, a program as the service application has been installed on the user device 4 so as to be started. The application user starts the service application at the user device 4 and uses service brought by the service application, which is a service result such as a commodity control, the stock control, and customer management. In this respect, the service application uses the API prepared by the API server 20 and performs required information access.

Roughly, the processes at service execution are performed in the following procedure of (R1) to (P4).

(P1) Based on the started service application, the user device 4 transmits the API use request (request of information access execution using the API) to the API server 20. In this case, the service code and the license key are also transmitted.

(P2) The API server 20 performs the authentication process based on the service code and the license key accompanied by the API use request with the function of the authentication unit 21. The API server 20 notifies the authentication result to the user device 4.

(P3) If the authentication is passed, the API server 20 performs an individual result management process regarding the application provider and the application user based on the service code and the license key with the function of the result management unit 22.

(P4) If the authentication is passed, the API server 20 permits the API use. That is, in response to the request generated in a course of the process by the service application, the API is used.

Figure 16:
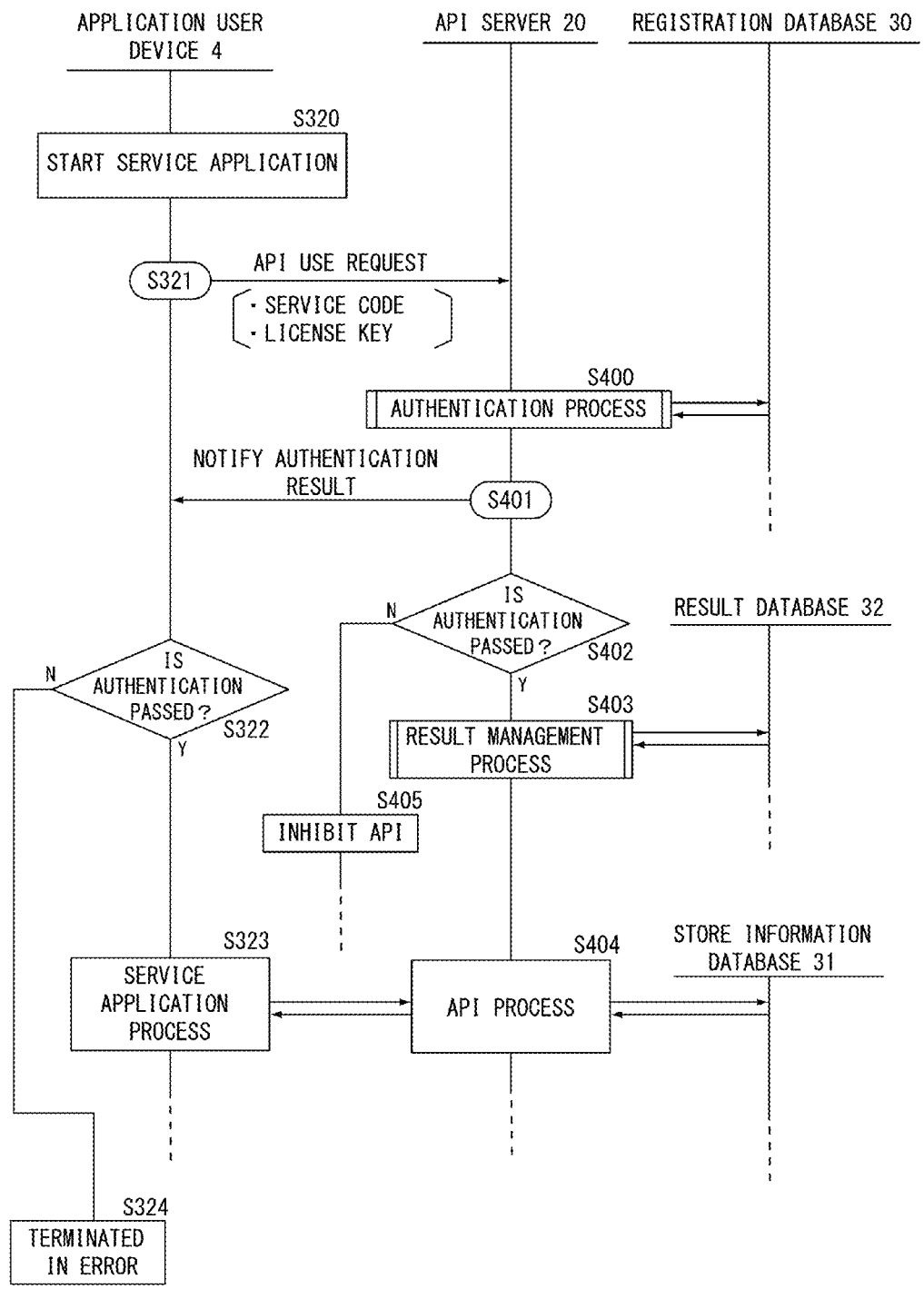
FIG. 16 is an explanatory view of an exemplary process I at the use of service of the embodiment.

The following describes specific exemplary processes of the respective units at execution of the service. FIG. 16 mainly illustrates the processes by the user device 4 and the API server 20. The processes by the API server 20 illustrated in FIG. 16 to FIG. 18 include the processes performed by the authentication unit 21 using the functions of the authentication processor 21*a* and the registration information acquisition unit 21*b*, which are described in FIG. 3, the process with the function of the result management unit 22, and the process by the API 24.

In the case where the application user executes the service application by the own user device 4, first, the user device 4 starts the service application as Step S320 in FIG. 16. When starting the service application, the application user is requested to input the license key. Actually, the user device 4 internally stores the license key at a predetermined portion (specific folder that can be referred to by the service application or a similar folder). It is only necessary that the service application can obtain the license key at the start. In a state where the service code is embedded on the application provider side, the service application is provided to the application user by download over the network 2 or exchange through a storage medium and has been installed on the user device 4. At the start of the service application, this service code is also obtained.

By the start of the service application, the user device 4 performs the processes subsequent to Step S321, which are processes specified by the service application. At Step S321, the user device 4 transmits the API use request to the API server 20. At this API use request, the user device 4 also simultaneously transmits the service code and the license key. The API use request also includes the service identification information and information for specifying the API subject to the use request. The service identification information indicates the service application that has performed the request.

Figure 17:
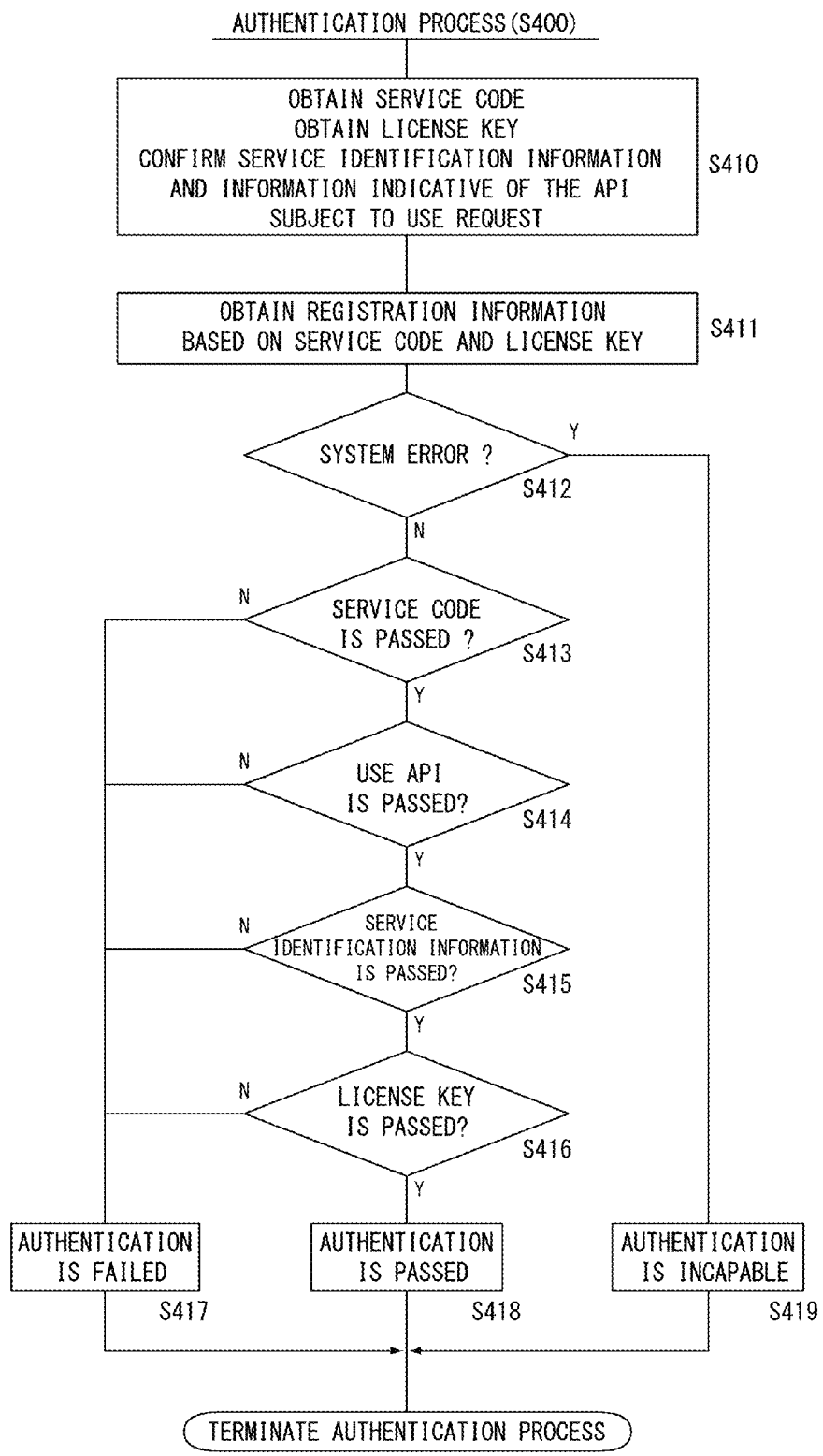
FIG. 17 is a flowchart for an authentication process at the use of service of the embodiment.

At Step S400, the API server 20 performs the authentication process with the function of the authentication unit 21 in response to the API use request. FIG. 17 illustrates this authentication process. FIG. 17 illustrates the processes performed by the authentication unit 21, which has the functions as the authentication processor 21*a* and the registration information acquisition unit 21*b*. At Step S410 in FIG. 17, the authentication unit 21 obtains the service code and the license key transmitted from the user device 4 together with the API use request. The authentication unit 21 also obtains the service identification information and information indicative of the API subject to use request included in the information as the API use request.

Subsequently, at Step S411, the authentication unit 21 accesses the registration database 30 using the service code and the license key to obtain the registration information corresponding to the service code and the license key. Describing using FIG. 4, as the registration information corresponding to the service code, the authentication unit 21 obtains the service identification information, information on the application provider, and the use API information. As the registration information corresponding to the license key, the authentication unit 21 obtains the user-specific information and the license approval information corresponding to the license key itself. For example, in the case of the license key LC#A, the authentication unit 21 obtains a user-specific information MC-A and the license approval information on the license key LC#A.

At Step S412, the authentication unit 21 checks for system error. For example, if the registration information cannot be appropriately read due to a cause of hardware on the system, causes of a communications system and a transmission path, and other operating errors, this situation is regarded as a system error. In this case, the process proceeds to Step S419 to conduct a final determination that the authentication is incapable.

If the system error does not occur and the registration information can be successfully accessed, the process moves to the actual authentication process. First, at Step S413, the authentication unit 21 performs the authentication on the service code. For example, the authentication unit 21 confirms the following.

Confirmation on Whether the Service Code is Regularly Registered or not

The authentication unit 21 confirms whether the service code transmitted together with the API use request is the service code registered with the registration database 30 or not.

Confirmation of Presence of the Registration Information

Based on the service code, the authentication unit 21 confirms whether the service identification information, the information on the application provider, and the use API information are appropriately registered and can be obtained or not. For example, if the above-described confirmations are passed, the authentication of the service code is passed. If any of the confirmations are not met, the authentication of the service code is failed.

At Step S414, the authentication unit 21 performs the authentication on the use API. For example, the authentication unit 21 confirms the following.

Confirmation of Match of the Use APIs

In the API use request, whether the API subject to use request matches the API indicated by the use API information of the registration information or not is confirmed. Only a perfect match of the plurality of APIs may be passed. However, when one or all of the plurality of APIs subject to use request in the API use request are shown in the use API information of the registration information, the APIs may be passed.

Confirmation on Usable State of API

On the EC management system 1, the API may be set unusable for any reason or the use of the API may be stopped due to maintenance or a similar reason. For example, the API server 20 manages such condition of the provided respective APIs. Accordingly, whether one or the plurality of APIs subject to use request in the API use request is currently usable or not is confirmed. For example, if the above-described confirmations are passed, the authentication of the use API is passed. If any of the confirmations are not met, the authentication of the use API is failed.

At Step S415, the authentication unit 21 performs the authentication process on the service identification information. For example, the authentication unit 21 confirms the following.

Confirmation of Match with the Registration Information
Whether the service identification information indicated by the API use request matches the service identification information of the registration information read based on the service code or not is confirmed. That is, whether the service application transmitting the API use request this time is the regularly registered service application or not is confirmed. For example, if the above-described confirmations are passed, the authentication of the service identification information is passed. If any of the confirmations are not met, the authentication of the service identification information is failed.

At Step S416, the authentication unit 21 performs the authentication process on the license key. For example, the authentication unit 21 confirms the following.

Confirmation of Validity of the License Key
Whether the license key and the service code transmitted in the API use request is also associated as the registration information or not, that is, whether the license key is validly registered corresponding to the service application or not is confirmed.

License Approval Confirmation
Corresponding to the license key transmitted in the API use request, the license approval information read from the registration database 30 is confirmed. For example, in the above-described confirmations, as long as the validity of the license key is passed and the license approval information is information indicative of "approved", the authentication of the license key is passed. Meanwhile, if the validity is failed or the license approval information is "unapproved" or "disapproved", the authentication of the license key is failed.

When the authentications are all passed at Step S413 to Step S416, the authentication unit 21 proceeds to Step S418 and finally passes the authentications. On the other hand, if the any of the authentications are failed at Step S413 to Step S416, the authentication unit 21 proceeds to Step S417 and finally fails the authentications.

This authentication ensures safety of the information in association with the API use by the service application. The service code authentication confirms validity that the service application has been properly registered by the application provider. The authentication of use API information confirms an authority within the range of the used API. The license information confirms validity of the application user in the relationship with the application provider and the API use within the approved range of the application user. In view of this, within a range of an agreement of intentions of two persons, the application provider and the application user, valid API use by the service application can be ensured. Accordingly, the authentication process at least including confirmations of the service code, the use API information, and the license approval information are preferable.

The above-described authentication processes are one example. It is not necessary to always perform the authentication on the above-described all items. For example, as the registration information, whether the information on the application provider corresponding to the service code can be obtained or not needs not to be confirmed. However, assume the case where the above-described confirmations are conducted on all the service code, the service identification information, the use API information, and the license key at Step S413 to Step S416. Determining this situation as finally passing the authentication is preferable in the aspect of safety of information at the execution of service. Additionally, other authentication items may be added. For example, at the API use request, as long as the information on the application provider is also transmitted, a match between the information on application provider and the registration information may be confirmed. Similarly, at the API use request, as long as the information indicative of the application user is transmitted, a match with the user-specific information corresponding to the license key may be confirmed.

At Step S400 in FIG. 16, for example, the authentication process is performed as illustrated in FIG. 17, which is described above. The API server 20 that obtains the authentication result performs authentication result notification to the user device 4 at Step S401. That is, the API server 20 notifies the authentication pass, authentication failure, or authentication incapability, which is obtained at Step S416 or Step S417 in FIG. 17.

If the authentication is failed or the authentication is incapable, the API server 20 proceeds from Step S402 to Step S405 in FIG. 16, inhibits the API use, and terminates the process to the API use request. If the user device 4 receives a notification of the authentication failure or the authentication incapability, the user device 4 proceeds from Step S322 to Step S324. Thus, the service application is terminated in error.

Figure 18:
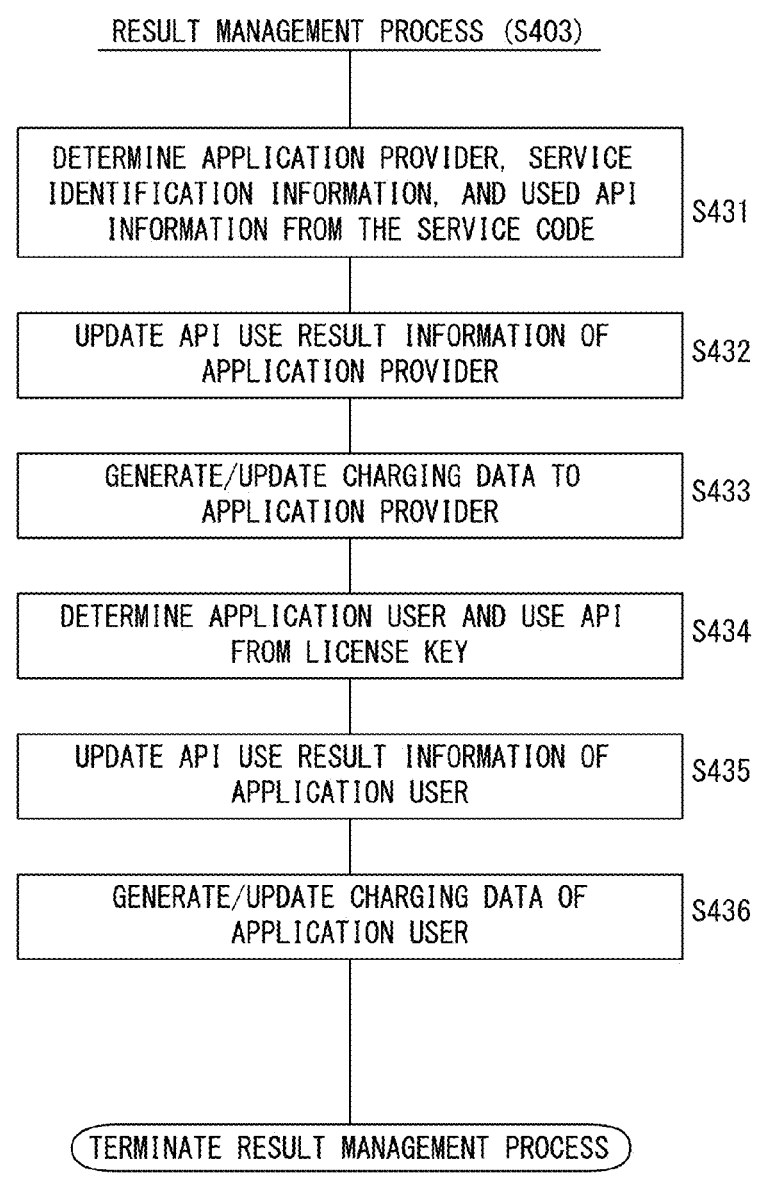
FIG. 18 is a flowchart for a result management process at the use of service of the embodiment.

If the authentication is passed, the API server 20 proceeds from Step S402 to Step S403 and performs the result management process with the function of the result management unit 22. FIG. 18 illustrates this result management process. The result management unit 22, for example, performs the result management process using the service code and the license key in response to the notification of the result of authentication pass from the authentication unit 21.

FIG. 19 illustrates exemplary result information stored in the result database 32. As the result information on the application provider, the API use result is stored on each application provider V1, V2 . . . . For example, whenever the API is used, date and time, information indicative of the use API information indicative of the application program, information indicative of the application user, and charging data are stored. Similar to the result information on the application user, the API use result is stored on each application user M1, M2 . . . . For example, whenever the API is used, the date and time, the used API, the information indicative of the application program, and the charging data indicative of the application provider are stored. As the information indicative of the use API, the use API information derived from the service code can be employed. As the information indicative of the application program, the service identification information derived from the service code can be employed. As the information indicative of the application user, the user-specific information derived from the license key can be employed. As the information indicative of the application provider, the information on the application provider derived from the service code can be employed. The charging data is a unit price and accumulated amount of money corresponding to the used API or similar information. The result information is not limited to the examples as illustrated in FIG. 19, but other items that should be stored are variously considered. In any cases, it is only necessary that with the result information, the use result of the API and an amount of charged money corresponding to the use result can be comprehended.

The result management unit 22, for example, updates and adds the result information of the application provider and the result information of the application user, or performing a similar operation. At Step S431 in FIG. 18, the result management unit 22 determines an application provider V(x), the service identification information, and the use API information from the service code. This information may be obtained as the registration information read at authentication. Alternatively, the information may be obtained by access of the result management unit 22 to the registration database 30. At Step S432, the result management unit 22 updates the use API information of the application provider. For example, to the result information, which is as illustrated in FIG. 19, on the application provider V(x) derived from the service code date and time of the API use request at this time, the used API, the service identification information, and the user-specific information are added. At Step S433, the result management unit 22 generates the charging data to the application provider related to the API use request at this time. Then, the charging data is added to the result information.

At Step S434, the result management unit 22 determines the application user M(x) from the user-specific information derived from the license key. The user-specific information may be obtained as the registration information read at authentication. Alternatively, the information may be obtained by access of the result management unit 22 to the registration database 30. At Step S435, the result management unit 22 updates the use API information of the application user. For example, the date and time regarding the API use request at this time, the use API, the service identification information, and the information on the application provider are added to the result information, which is as illustrated in FIG. 19, on the application user M(x) specified by the user-specific information. At Step S436, the result management unit 22 generates the charging data to the application user regarding the API use request at this time. Thus, the charging data is added to the result information.

The result management process as Step S403 in FIG. 16, for example, is performed as illustrated in FIG. 18, which is described above. This allows result management and charging data formation by the respective application provider and application user regarding the API use, allowing easily comprehending the result of the person involved in the API use. Since the API is used through authentication, it is ensured that the result information is based on the result of valid API use. In this meaning, the charging data to the respective application provider and application user can be calculated as an amount of money cost for the valid API use. Note that FIG. 18 is merely one example. A data configuration of the result information is variously assumed. According to a data type, a database format or a similar condition of result data to be set, it is only necessary to add and update the required result information to the respective application provider and application user. It may be considered that the result management is not a method to comprehensively register the use result in the case of authentication pass, but is a method where the use result is registered whenever the API is actually used in the course of a process during the service execution by the application program.

In the case of the above-described authentication is passed, the user device 4 proceeds from Step S322 to Step S323 and a normal process of the service application is executed. In the course of a process of the service application, the API prepared by the API server 20 is used and the information regarding the application user is accessed. On the API server 20 side, in response to the request from the service application, the API process is performed as illustrated as Step S404, and information in the store information database 31 is accessed. For example, as illustrated in FIG. 15, the store information database 31 saves business information M1$dt$, M2$dt$ ... or similar information regarding the respective application users M1, M2 .... Now, assume that the application user M1 employs the user device 4 illustrated in FIG. 15. By the process of the service application, the user device 4, for example, uses the API#1 to access the own business information M1$dt$. Using this access, the service application shows the commodity inventory, the price management, the customer information, or similar information, performs editing or a similar operation to the application user M1 on the user device 4. That is, the user device 4 provides the network service.

Such information access by the API use is performed after the above-described authentication using the service code and the license key. Accordingly, the API is not used more than necessary. Since the API use is restricted within a range of valid use, safety of the information such as the business information M1$dt$ is ensured. Since the authentication of the license key specifies the application user, data processed using the API can be limited. For example, in the case where the user device 4 of the application user M1 uses the API, for example, although the business information M1$dt$ is accessed through the API#1, business information M2$dt$, which is information of another person, can be set so as not to be accessed. Practically, filtering may be performed such that only the information for the authenticated application user M1 may be accessed using the API#1 based on the authentication result. This allows the respective application users M1, M2 ... can access the own business information and can perform browsing, update, or a similar operation. Moreover, the own business information can be set so as not to be accesses by other persons. That is, assuming the API treating information that limits the user, limiting the information accessed using the API based on the authentication result of the license key is preferable. However, in the case where the API treats information open to public, which does not especially limit users, such filtering of information, which limits information to be accessed depending on the application user, may not be performed.

Now, regarding the license approval by the application user, the batch approval and the individual approval of the use APIs are described above. The above-described processes at the service execution that includes the authentication and the result management assume the batch approval. By use of the individual approval, the final result of the authentication process may be permission to use of some APIs. That is, the use of the API to which the license is not approved by the application user is inhibited. For example, regarding the authentication of the license key at Step S406 in FIG. 17, some APIs are possibly "approved" while some APIs are "disapproved." In this case, the authentication is passed with restrictions where the "approved" APIs are permitted. In this case, for example, in the result management process, it is appropriate that only the used information and the charging information of the API whose use was authenticated be updated. The presence of the unusable API probably restricts some processing functions of the service application.

5. Exemplary Process II at Service Execution

The following describes the exemplary process II at the service execution with reference to FIG. 20 to FIG. 23. The basic processes in the case of the exemplary process II are similar to the above-described (P1) to (P4). However, this example differs in that the limited number of copies and terminal identification information are added to the registration information and the limited number of copies and the terminal identification information are confirmed at the execution of service.

Figure 20:
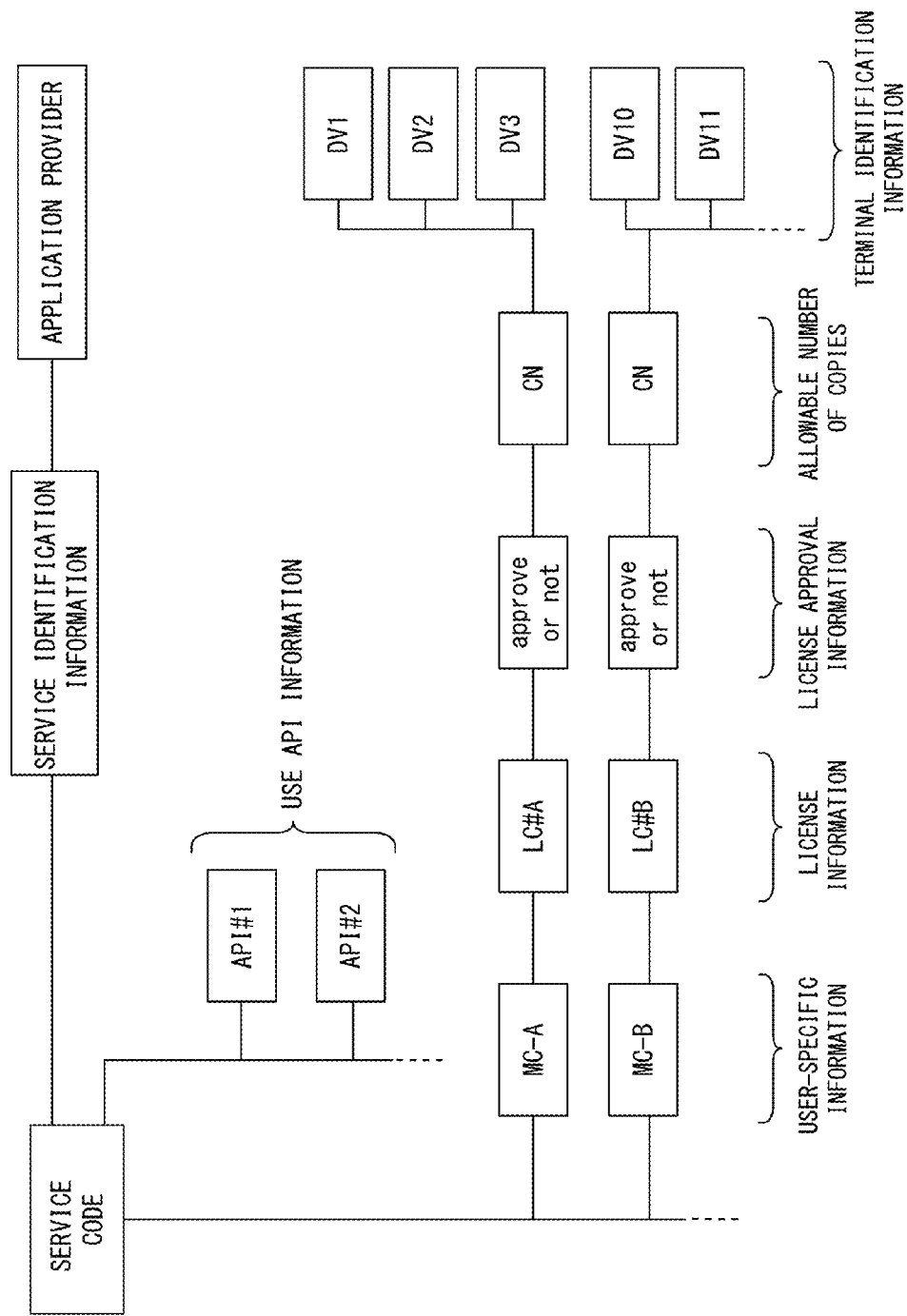
FIG. 20 is an explanatory view of another registration information of the embodiment.

FIG. 20 illustrates exemplary registration information in this case. The difference from FIG. 4 is that a limited numbers of copies CN are registered corresponding to respective license keys LC#A and LC#B or one or a plurality of terminal identification information DV (DV1, DV2 . . . ) is registered. These registrations may be performed in the course of the above-described registration process or may be performed as an independent terminal registration. For example, these registrations may be performed when the service application is started at the user device 4 for the first time. The following describes the example of when the registration is performed at the initial start.

Figure 21:
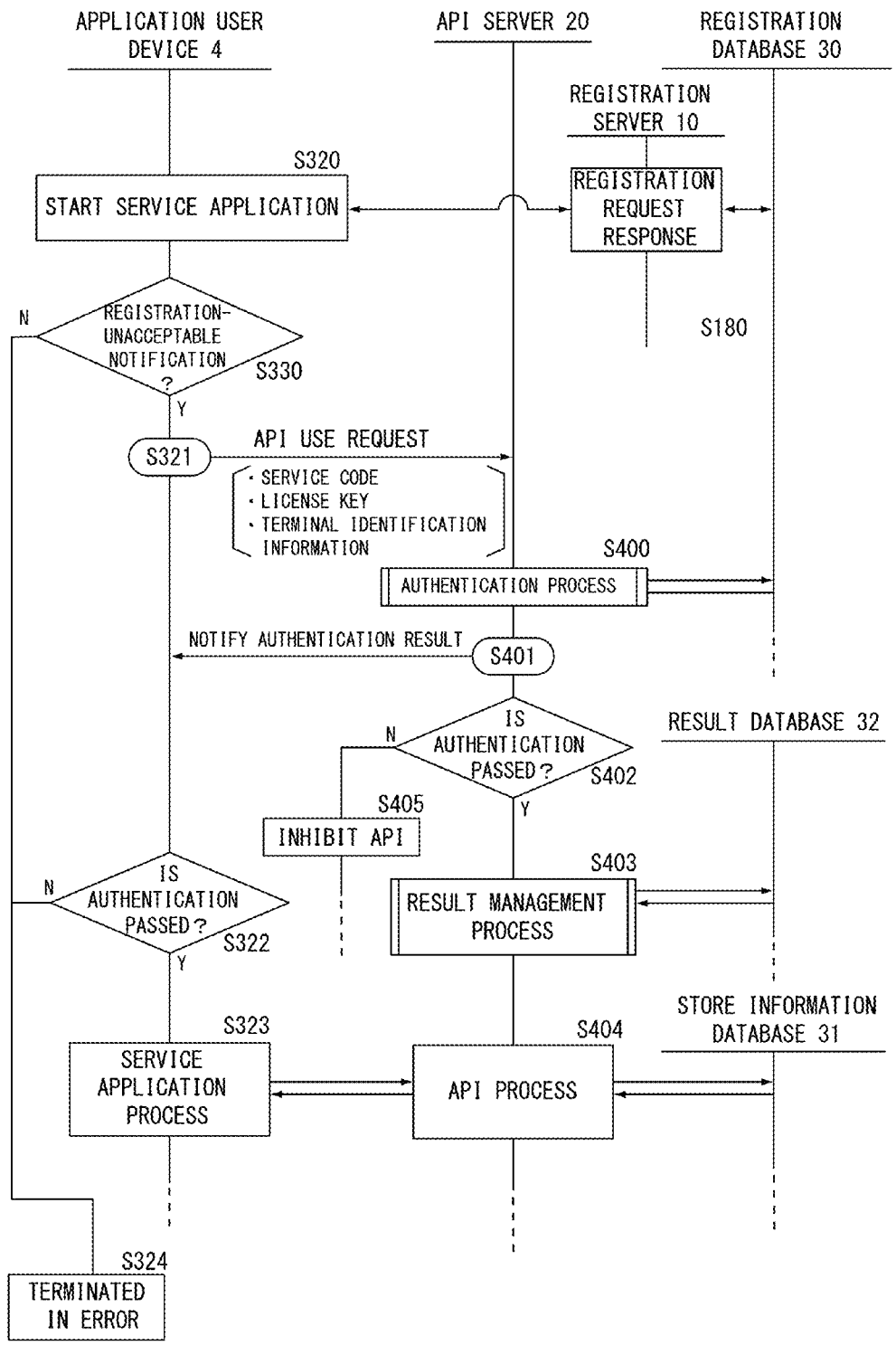
FIG. 21 is an explanatory view of operations at the use of service of the embodiment.

FIG. 21, similarly to the above-described FIG. 16, mainly illustrates the processes by the user device 4 and the API server 20. The same step numbers are assigned to processes similar to FIG. 16, and therefore such elements will not be further elaborated here. The differences in the user device 4 are: the process of when the service application starts at Step S320, addition of Step S330, and further a transmission content at Step S321. On the API server 20 side, the authentication process at Step S400 differs. Additionally, corresponding to Step S320, the registration server 10 performs a registration request response process at Step S180.

Figure 22:
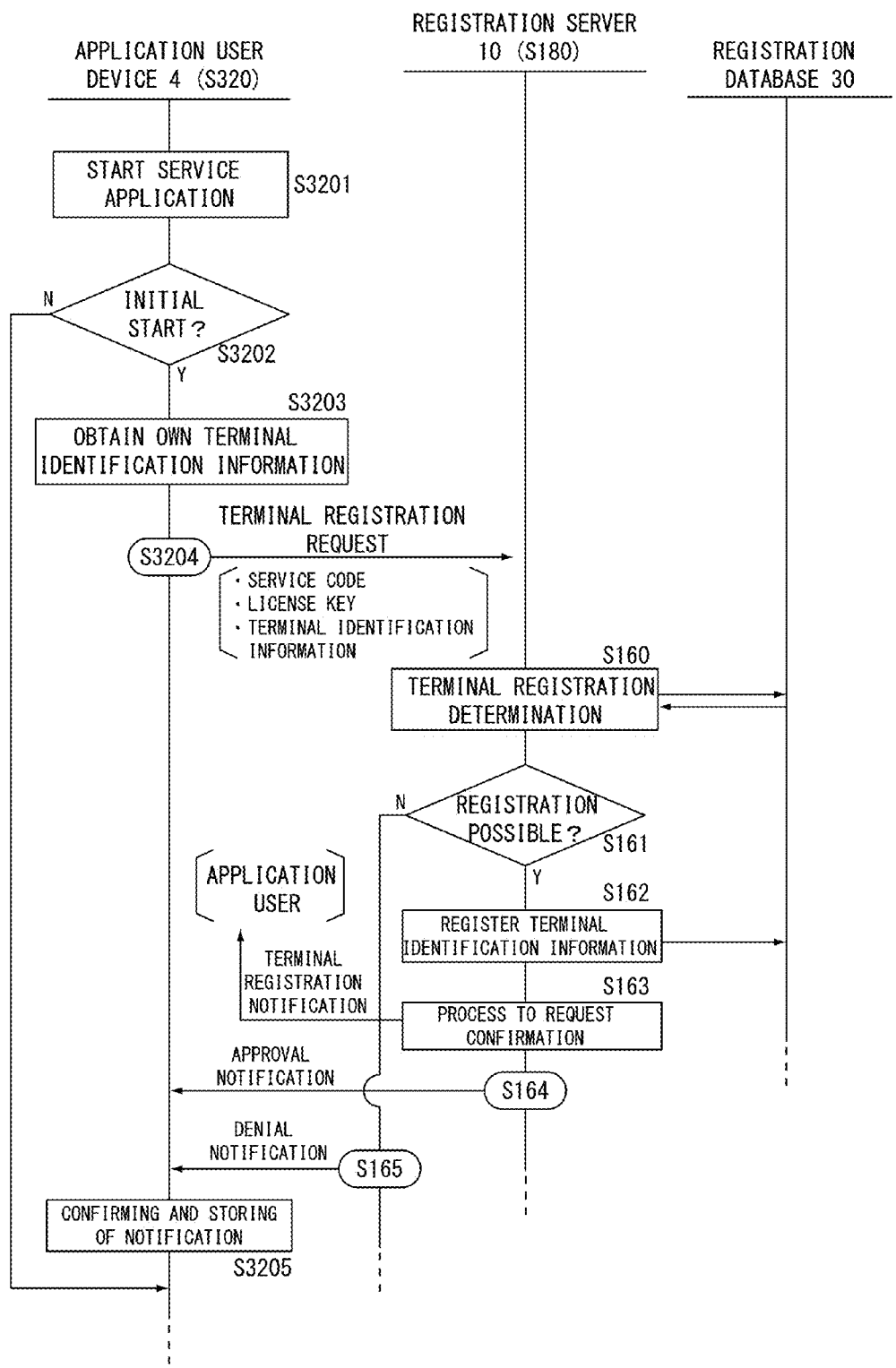
FIG. 22 is an explanatory view of an exemplary process II at the use of service of the embodiment.

First, FIG. 22 illustrates the process of starting the service application by the user device 4 at Step S320 and the correspond process by the registration server 10. At Step S3201 in FIG. 22, the user device 4 starts the service application. The user device 4, which performs processes based on the service application, determines whether the start of this time is the first time on the terminal as the user device 4 or not. If not the initial start, the user device 4 exits the process from Step S3202. In this case, the user device 4 terminates Step S320 in FIG. 21. Only the case of the initial start, the process proceeds from Step S3202 to Step S3203. At Step S3203, the user device 4 obtains own terminal identification information. The terminal identification information is information with which the terminal itself can be identified. As the terminal identification information, for example, a Media Access Control address (MAC address), a product serial number as the information processing device, or similar information is assumed. The user device 4 transmits a terminal registration request to the registration server 10 at Step S3204. At this time, the user device 4 also transmits the service code, the license key, and the terminal identification information together with the terminal registration request. This terminal registration request may be performed using the user WEB 13. Alternatively, the terminal registration request may be configured so that the user device 4 transmits the terminal registration request to the EC management system 1 without through a website.

In response to the terminal registration request, in the registration server 10, the registration management unit 11, for example, determines whether the terminal registration is acceptable or not with the function of the license processor 11b at Step S160. In this case, for example, with the service code, the registration database 30 is accessed to read the registration information. For example, the registration management unit 11 confirms the following or similar information.

Whether the service code has been registered

Whether the license key corresponds to the service code

Whether the license approval information of the license key is "approved"

Whether the number of terminal identification information DV already registered on the license key has not reached the limited number of copies CN Whether the transmitted terminal identification information has already been registered as the terminal identification information DV Whether the transmitted terminal identification information is not set as a registration inhibition target (is put on a blacklist, for example)

When these conditions are met, the registration is determined as possible.

When determined as registrable, the registration server 10 proceeds from Step S161 to Step S162. The registration server 10 makes the transmitted terminal identification information upon the terminal registration request correspond to the license key and registers the terminal identification information with the registration database 30.

The registration server 10 performs a registration confirmation process at Step S163. The registration confirmation process is a process to request confirmation on the terminal registration to the application user. The registration confirmation process at least notifies the application user of the terminal identification information registration (terminal registration notification). This notification is performed on the application user indicated by the user-specific information registered corresponding to the license key. Accordingly, the terminal identification information may be notified to the user device 4 that actually has transmitted the terminal registration request; however, the terminal identification information may be notified to another user device 4. The notification, for example, may be transmitted as an e-mail addressing an e-mail address derived from the user-specific information or may be transmitted by other methods. This Step S163 is consistently a process that notifies the application user registered with the user-specific information. This notification allows the regular application user to know that terminal identification information of a certain user device 4 has been registered. This does not cause a problem as long as the certain user device 4 is a terminal used by the application user himself/herself or is a terminal under management. However, if the certain user device 4 is a terminal unknown to the application user, there is a possibility that the service application and the license key are illegally copied or stolen, resulting in a leak. Thus, this notification allows the application user to notice dangerousness of illegal use.

The registration confirmation process at Step S163 at least performs the above-described terminal registration notification. However, the following processes may further be performed. For example, with respect to the terminal registration notification, notification of the terminal registration approval from the application user may be waited. Only when the notification of the terminal registration approval is obtained, the terminal identification information registered at Step S162 may be effective. That is, insofar as the service application starts based on the management by the valid application user, the approval notification is requested to the application user. Accordingly, the approval notification keeps validity of the registration of the terminal identification information. On the other hand, if the approval notification cannot be obtained within a predetermined period or denial notification is transmitted from the application user, the registered terminal identification information DV may be deleted. Then, the process may proceed to Step S165 similar to the case where it is determined that the terminal identification information cannot be registered at Step S161. In the case of denial notification, registering the target terminal identification information with the above-described blacklist is also considered.

Subsequently, the registration server 10 performs registration completion notification on the user device 4 at Step S164. The user device 4, which is a notification destination in this case, is a terminal that has transmitted the terminal registration request at Step S3204. That is, the registration completion notification is result notification in response to the terminal registration request. On the other hand, in the case where registration is not allowed, the registration server 10 proceeds from Step S161 to Step S165 and performs registration-unacceptable notification to the user device 4. At Step S3205, the user device 4 confirms and stores the registration completion notification or the registration-unacceptable notification.

The above-described processes in FIG. 22 are performed at Steps S320 and S180 in FIG. 21. After the start process of Step S320, the user device 4 confirms the stored registration notification at Step S330. That is, as long as at the initial start, since whether the registration completion notification or the registration-unacceptable notification is received immediately before, the user device 4 confirms the result. At the start of the second time or the subsequent times, at the initial start, the notification is performed by the above-described process in FIG. 22. Then, whether the registration completion notification is stored or the registration-unacceptable notifications is stored is confirmed. At Step S330, in the case where the notification content is the registration-unacceptable notification, the user device 4 is a terminal with which the terminal identification information DV is not registered. In this case, the terminal is not recognized as a terminal that uses the regular service application. The user device 4 proceeds to Step S324 and is terminated in error.

When the registration completion notification is confirmed, the process proceeds from Step S330 to Step S321, the user device 4 transmits the API use request to the API server 20. At this API use request, the user device 4 simultaneously transmits the service code, the license key, and further the terminal identification information. Note that the API use request includes the service identification information, which indicates the service application that has performed the request, and information for specifying the API subject to use request. The user device 4 side processes the subsequent Steps S322, S323, and S324 similar to the exemplary processes I in FIG. 16.

Figure 23:
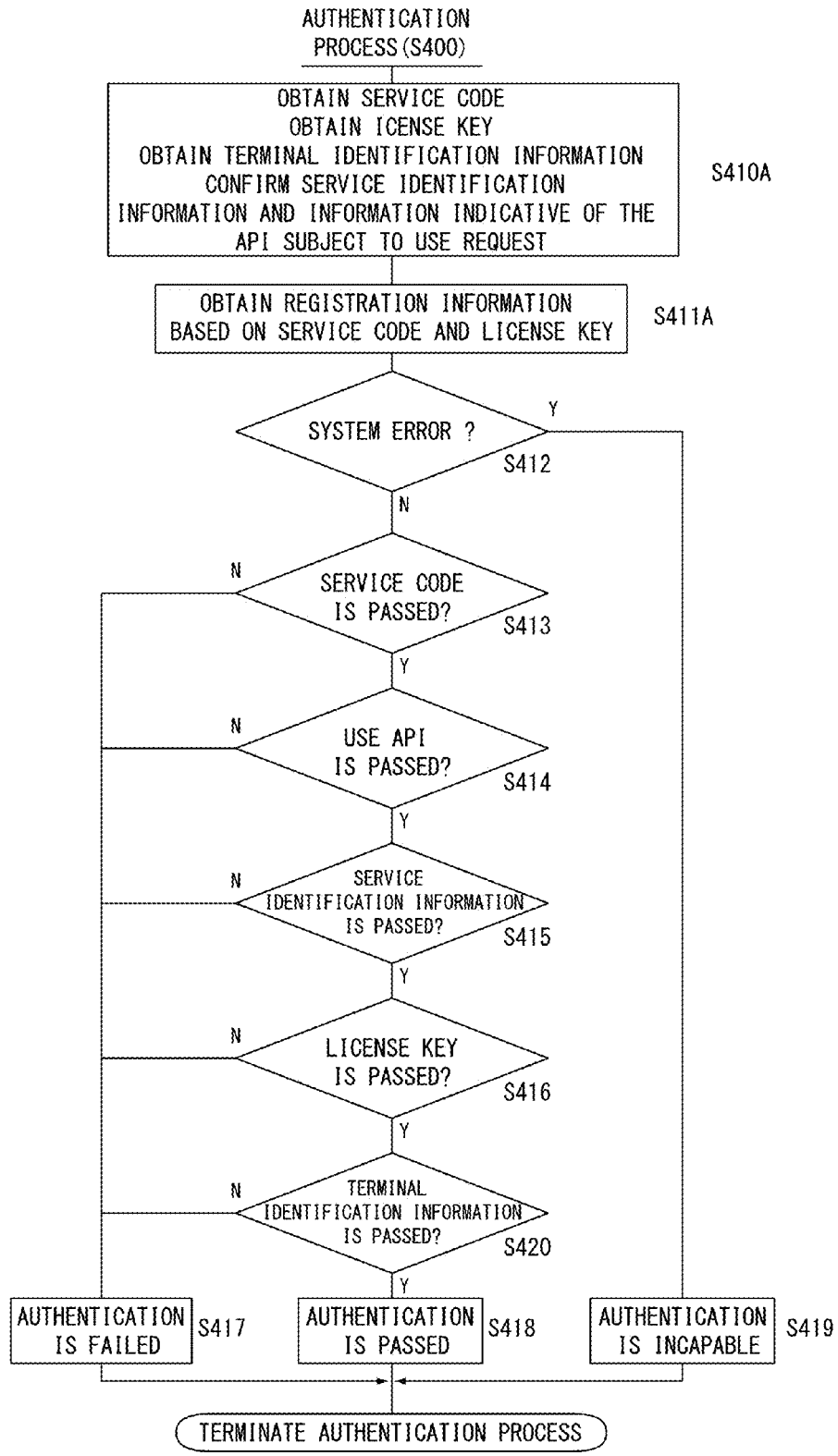
FIG. 23 is a flowchart for the authentication process at the use of service of the embodiment.

The API server 20 performs the processes of Steps S400 to S404 on the API use request similar to the case of FIG. 16. However, since the process differs in the authentication process at Step S400, FIG. 23 describes the processes. FIG. 23 illustrates the authentication process performed by the API server 20 with the authentication unit 21. At Step S410A, the authentication unit 21 obtains the service code, the license key, and further the terminal identification information, which are transmitted from the user device 4 together with the API use request. The authentication unit 21 also obtains the service identification information and information indicative of the API subject to use request, which are included in the information as the API use request. At Step S411, the authentication unit 21 accesses the registration database 30 using the service code and the license key. The authentication unit 21 then obtains the registration information corresponding to the service code and the license key. In this case, the authentication unit 21 obtains the registration information illustrated in FIG. 20. That is, as the registration information corresponding to the service code, the authentication unit 21 obtains the service identification information, information on the application provider, and the use API information. As the registration information corresponding to the license key, the authentication unit 21 obtains the user-specific information, the license approval information, and the terminal identification information corresponding to the license key itself. The registration information is, for example, in the case of the license key LC#A, license approval information regarding user-specific information MC-A and the license key LC#A and terminal identification information DV1, DV2, and DV3.

Since the subsequent Steps S412 to S419 are processes similar to the processes described in FIG. 17, and thus overlapping description will not be further elaborated here. In this example of FIG. 23, as Step S420, the terminal identification information is added to an authentication item. At Step S420, the authentication unit 21 performs, for example, the following confirmation as authentication regarding the terminal identification information.

Confirmation Whether the Terminal Identification Information is Regularly Registered or not Whether the terminal identification information, which is transmitted together with the API use request, matches the terminal identification information DV registered with the registration database 30 or not is confirmed. In this case, whether to match or not is confirmed by the correspondence relationship with the license key. For example, the description is given in the case of FIG. 20. In the case where the license key LC#A is transmitted from the user device 4 in the API use request, the authentication unit 21 confirms whether the terminal identification information transmitted from the user device 4 matches any one of the terminal identification information DV1, DV2, and DV3, which correspond to the license key LC#A, or not.

The authentication regarding such terminal identification information is added. Then, authentication result determination of Steps S417 and S418 are performed. Thus, the authentication process at Step S400 in FIG. 21 is completed. After that, the API server 20 performs the processes of Step S401 to Step S404 similar to the processes in FIG. 16.

As the above-described exemplary process II, determination using the limited number of copies and the terminal identification information allows further enhancing the safety in use of the service application. That is, the API server 20 can authenticate the user device 4 in units of terminals. In the case where an unregistered terminal is used, the API server 20 can deny the API use request determining the terminal having a possibility of illegal use. For example, if the service application is started by illegal copy of the service application and stealing of the license key, the API use can be inhibited. As the condition for registering the terminal identification information DV, "the number of terminal identification information DV already registered on the license key has not reached the limited number of copies CN" is set. This also allows preventing a flood of copies of the service applications.

The information on the limited number of copies CN may not be necessarily to be made correspond to the license key and be registered. For example, when setting the limited number of copies to, for example, "three times for one license key" on the system in all cases, the limited number of copies CN needs not to be registered. The limited number of copies may be registered making it correspond to the service application (service identification information). For example, the application provider can input the limited number of copies in the above-described API use registration request. In response to this, the registration server 10 causes the limited number of copies CN to be corresponded to the service identification information and the service code and be registered at the time point of Step S103 in FIG. 6. The limited number of copies CN may be set fixed preliminary to the service application that the application provider provides and may be notified to the registration server 10. In this case, the limited number of copies CN, which is a fixed value, is possibly made correspond to the service code and automatically registered.

In the case where the limited number of copies CN is made correspond to the license key, the application provider may able to set the limited number of copies CN to each customer (application user). For example, when the user-specific information is transmitted to the registration server 10 as the license issue request, the limited number of copies CN is made correspond to the user-specific information so as to set the limited number of copies CN. The registration server 10 registers the limited number of copies CN making it correspond to the license key and the user-specific information at the process of Step S113 in FIG. 7. This allows the application provider to set the allowable number of copies of the service application individually for the application users. For example, the allowable number of copies can be set according to a contract content of the service application provision or a similar condition.

The service user may be able to set the limited number of copies CN. For example, within the range whose upper limit as the limited number of copies CN is determined by the setting on the system or by the application provider, the application user can input the limited number of copies CN at the license approval. When registering the license approval information at Step S124 in FIG. 8, the registration server 10 makes the limited number of copies CN correspond to the license key and registers the limited number of copies CN. This case is effective for the application user to restrict a copy of the service application in order to strictly prevent own information (business information M1$dt$ or similar information) from being leaked.

The limited number of copies CN may not be registered. For example, when not restricting the number of copies, registering the limited number of copies CN is unnecessary. Alternatively, in the case where the application provider does not want to restrict the number of copies of the service application that the application provider provides, a method of not registering the limited number of copies CN of the service application for the application provider is also considered. An example of registering the limited number of copies CN while not registering the terminal identification information DV is also considered.

6. Exemplary Process III at Service Execution

Figure 24:
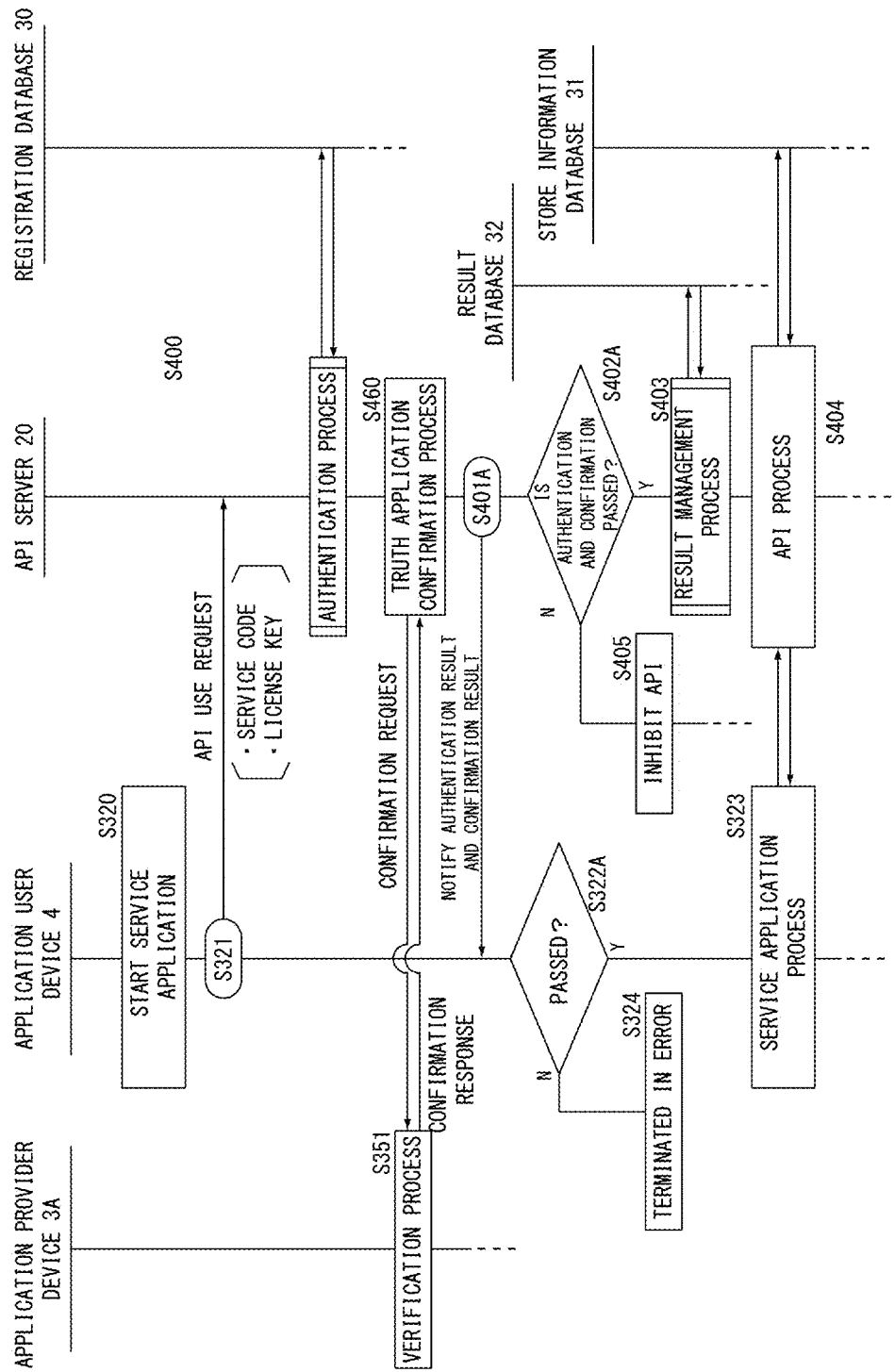
FIG. 24 an explanatory view of an exemplary process III at the use of service of the embodiment.

The following describes the exemplary process III at the service execution with reference to FIG. 24. The basic processes are similar to the above-described (P1) to (P4). However, this example performs confirmation to the application provider at the authentication to the API use request. FIG. 24 also illustrates the processes by the provider device 3A in addition to the processes by the user device 4 and the API server 20. In the processes by the user device 4 and the API server 20, the same step numbers are assigned to processes similar to FIG. 16, and therefore such elements will not be further elaborated here. This case differs from FIG. 16 in that the API server 20 performs a truth application confirmation process at Step S460.

The user device 4 transmits the API use request to the API server 20 and, for example, performs the authentication at Step S400. Then, the user device 4 notifies the confirmation request to the provider device 3A as the truth application confirmation process at Step S460. In this case, for example, the API server 20 transmits information indicative of a content and authority of the service application to be executed, such as the service code, the license key, the service identification information, and the user-specific information, to the provider device 3A. The provider device 3A performs a verification process. The verification process confirms whether, for example, the content and the authority of the service application is valid or not at Step S351. Then, the provider device 3A notifies the result to the API server 20 as a confirmation response. If the confirmation response is pass, the API server 20 processes as the provider confirmation pass. If the confirmation response is failure, the API server 20 processes as the provider response failure. The API server 20 notifies the user device 4 of the authentication result and the provider confirmation result at Step S401A.

If the authentication is failed, the authentication is incapable, or the provider confirmation is failed, the API server 20 proceeds from Step S402A to Step S405. Then, the API server 20 inhibits the API use and terminates the process to the API use request. If the user device 4 receives a notification of the authentication failure or the authentication incapability, or the notification of the provider confirmation failure, the process proceeds from Step S322A to Step S324. Thus, the service application is terminated in error. If the authentication is passed and the provider confirmation is passed, the API server 20 proceeds the process from Step S402A to Step S403, which is the result management process, and then the API process at Step S404. When obtaining the notifications of the authentication pass and the provider confirmation pass, the user device 4 proceeds from Step S322A to Step S323. Thus, the service application is normally processed.

Thus, at execution of the service, confirmation whether the service application is truth or not by the provider device 3A side allows eliminating the API use by an illegal application. Specifically, the following case is possible. The service code registered with a certain service application is stolen, added to another service application, which is not regularly registered, for use. The exemplary illegal uses are as follows. A malicious application user obtains a service application to which the service code has been added illegally and accesses the API server 20 using the self-issued license key. Further, the license key itself is stolen, and the third person illegally uses the service application. In the case where such illegal service application performs the API use request, confirming the content of the service application to the application provider side allows eliminating the illegal use. For confirmation on the application provider side (provider device 3A), for example, verifying the service identification information is considered. As the service identification information, including unique information to a title of one service application allows confirming the relationship between the service code and the service application.

The truth application confirmation process may include only a notification to the provider device 3A, and confirmation response acceptance may not be performed. This is to avoid a degrade of performance of service execution due to wait for the confirmation response. Even if the notification to the provider device 3A only, confirmation and treating by the application provider allows dealing with illegal application use post hoc. The truth application confirmation process is performed after the authentication at Step S400 as an example. However, the truth application confirmation process may be performed before the authentication process at Step S400. The truth application confirmation process may not be performed whenever the API use request is performed. For example, the truth application confirmation process may be performed only when the first API use request is performed by the service application or may be performed periodically. The above-described exemplary process III may be applied to the case of the exemplary process II.

7. Exemplary Process IV at Service Execution

The following describes a case of the ASP using the provider device 3B in FIG. 1 as the exemplary process IV at service execution. In the case where the provider device 3B is employed as the ASP, not the user device 4 but the provider device 3B starts the service application. Thus, the provider device 3B uses the API in association with the service application. This case may be basically considered as follows. The provider device 3B performs the processes by the user device 4 in the above-described exemplary processes I, II, and III. However, this exemplary process IV describes an example to which a process of eliminating the API use by a malicious ASP is also added.

Figure 25:
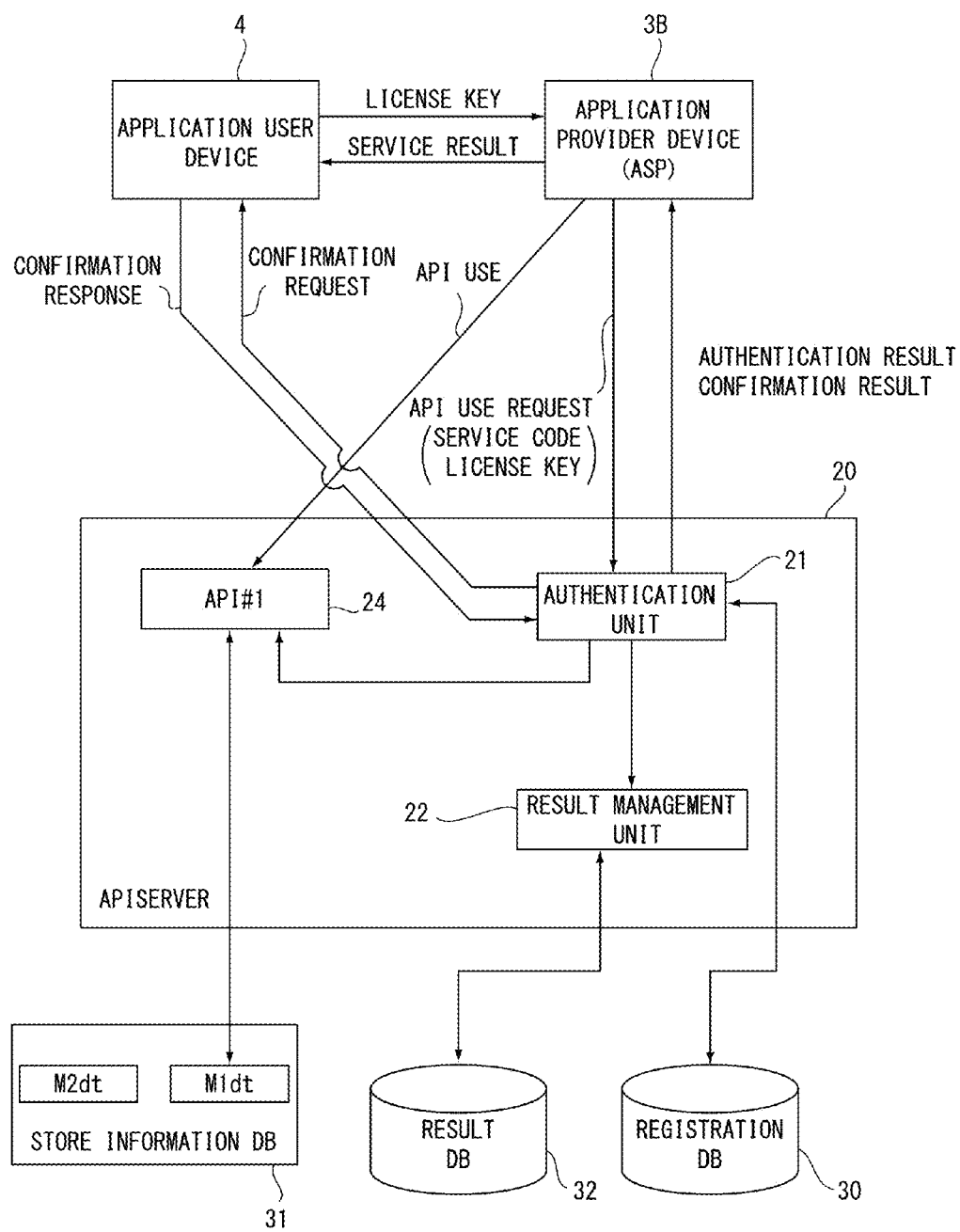
FIG. 25 is an explanatory view of operations at the use of service of the embodiment.

FIG. 25 schematically illustrates exchange of information for the authentication and the API use processes at the service execution between related sites. In this case, the provider device 3B side prepares the service application. The provider device 3B executes the service application in response to a request from the user device 4. That is, the provider device 3B starts the service application. In this respect, the service application uses the API prepared by the API server 20 and performs necessary information access. For example, in response to the request from the user device 4 of the application user M1, the service application, which is started at the provider device 3B, accesses the business information M1*dt* using the API#1. Then, the service application provides the results of service, such as the commodity control, the stock control, and the customer management, to the user device 4. This configuration allows the application user to use the service from the service application.

Roughly, the processes at service execution are performed in the following procedure of (P11) to (P14).

(P11) The provider device 3B receives the service request and the license key from the user device 4. Based on the started service application, the provider device 3B transmits the API use request to the API server 20. In this case, the service code and the license key are also transmitted.

(P12) The API server 20 performs the authentication process based on the service code and the license key accompanied by the API use request with the function of the authentication unit 21. Then, the authentication result is notified to the provider device 3B. At this time, as a truth use confirmation process, the confirmation request and the confirmation response are exchanged between the API server 20 and the user device 4. The API server 20 also notifies the provider device 3B of the confirmation result.

(P13) If the authentication is passed, the API server 20 performs an individual result management process regarding the application provider and the application user based on the service code and the license key with the function of the result management unit 22.

(P14) If the authentication is passed, the API server 20 permits the API use. That is, in response to the request generated in a course of the process by the service application, the API is used.

Figure 26:
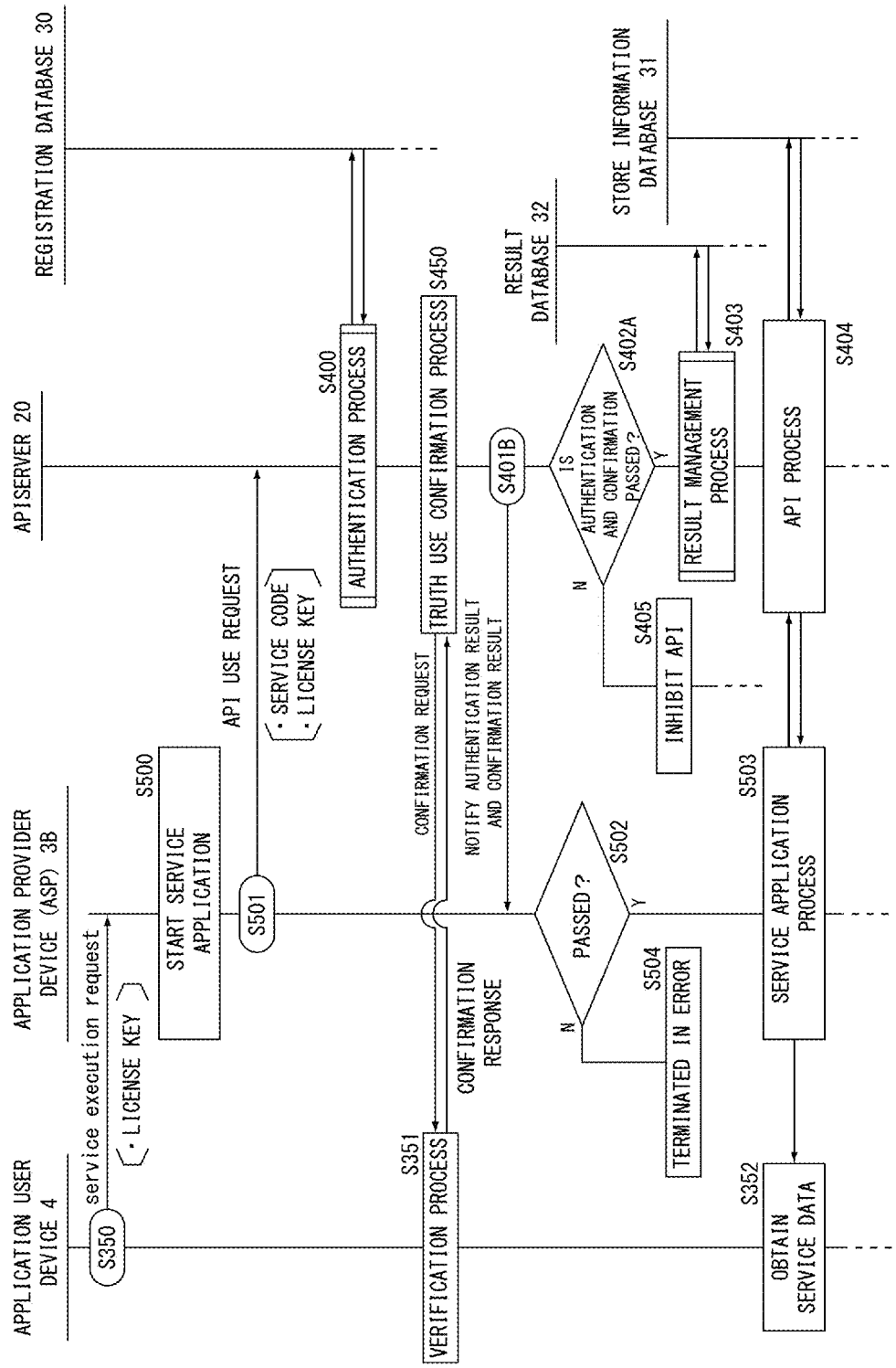
FIG. 26 is an explanatory view of an exemplary process IV at the use of service of the embodiment.

With reference to FIG. 26, the following describes specific process examples of respective units during the service execution. FIG. 26 illustrates the processes by the user device 4, the provider device 3B, and the API server 20. The processes by the API server 20 in FIG. 26 include the processes performed by the authentication unit 21 using the functions of the authentication processor 21*a* and the registration information acquisition unit 21*b*, which are described in FIG. 3, the process with the function of the result management unit 22, and the process by the API 24.

To use the service as the ASP provided by the application provider, the application user requests the service execution to the application provider. That is, the user device 4 transmits a service execution request to the provider device 3B at Step S350. At this time, the obtained license key of the service is also transmitted.

The provider device 3B starts the service application in response to the service execution request at Step S500. Starting the service application causes the provider device 3B to perform the process at Step S501 or the subsequent processes as processes specified by the service application. At Step S501, the provider device 3B transmits the API use request to the API server 20. At this API use request, the provider device 3B simultaneously transmits the service code added to the service application and the license key received from the user device 4. The API use request also includes the service identification information and information for specifying the API subject to the use request. The service identification information indicates the service application that has performed the request.

In response to the API use request, the API server 20 performs, for example, the authentication process described in FIG. 17 and FIG. 23 with the function of the authentication unit 21 at Step S400. Subsequent to the authentication process, the API server 20 performs the truth use confirmation process at Step S450. In this case, the API server 20 transmits the confirmation request to the user device 4 indicated by the user-specific information registered corresponded to the license key. For example, based on the license key, the service identification information, the user-specific information, or similar information, information indicative of the content and the authority of the service application to be executed is transmitted to the user device 4. The user device 4 performs the verification process. The verification process confirms whether, for example, the content and the authority of the service application is valid or not at Step S351. Then, the user device 4 notifies the result to the API server 20 as the confirmation response. If the confirmation response is pass, the API server 20 processes as the user confirmation pass. If the confirmation response is failure, the API server 20 processes as the user response failure. The API server 20 notifies the provider device 3B of the authentication result and the user confirmation result at Step S401B.

If the authentication is failed, the authentication is incapable, or the user confirmation is failed, the API server 20 proceeds from Step S402A to Step S405. Then, the API server 20 inhibits the API use and terminates the process to the API use request. If the provider device 3B receives a notification of the authentication failure or the authentication incapability, or the notification of the user confirmation failure, the process proceeds from Step S502 to Step S504. Thus, the service application is terminated in error. If the authentication is passed and the user confirmation is passed, the API server 20 proceeds from Step S402A to Step S403, which is the result management process, and then the API process at Step S404. When obtaining the notifications of the authentication pass and the user confirmation pass, the provider device 3B proceeds from Step S502 to Step S503. Thus, the service application involving the API use is normally processed. Then, the provider device 3B transmits the service data obtained as the service result to the user device 4. The user device 4 receives the service data at Step S352. Thus, the application user uses the service.

As described above, as well as the case where the provider device 3B as the ASP executes the service application, similar to the case of the exemplary process I, the authentication and the result management are performed. This allows ensuring safety of information and individual result management of the application provider and the application user. In this exemplary process IV, the user device 4 side confirms whether the provider device 3B properly uses the service application or not at the service execution. This allows eliminating illegal API use where the malicious ASP steals the license key and executes the service application. Specifically, this prevents the application provider who steals the license key approved by a certain application user from executing the service application using the license key, and performing illegal browsing, a leak, falsification, or a similar action of the information on the application user (such as the business information M1$dt$).

It is only necessary for the application user side to confirm whether the service application is executed in response to the issue of regular service execution request or not. Accordingly, for example, it is also possible that the user device 4 side does not wait for the user operation but automatically transmits the confirmation response to the API server 20.

The truth use confirmation process may include only a notification to the user device 4, and confirmation response acceptance may not be performed. This is to avoid a degrade of performance of service execution due to wait for the confirmation response. Even if the notification to the user device 4 only, confirmation and treating by the application user allows knowing an illegal leak of the license key post hoc, allowing dealing with illegal service application use. The truth use confirmation process is performed after the authentication at Step S400 as an example. However, the truth use confirmation process may be performed before the authentication process at Step S400. The truth use confirmation process may not be performed whenever the API use request is performed. For example, the truth use confirmation process may be performed only when the first API use request is performed by the service application or may be performed periodically.

8. Effect Brought by Implementation of EC Management System

The operations by the registration server 10 and the API server 20 of the EC management system 1 are described above. This embodiment allows obtaining the following effects.

First, the information processing device as the EC management system 1 includes the registration server 10. The registration server 10 has functions as the service code processor 11$a$ and the license processor 11$b$. The service code processor 11$a$ generates the service code in response to the API use registration request transmitted from the provider device 3. The service code indicates that this service (service application) is registered as the API use service. Then, the service code processor 11$a$ makes the service identification information and the use API information to correspond to the service code and registers them. The license processor 11$b$ generates the license information in response to the user-specific information of the service transmitted from the provider device 3. The information access authority of the license information using the API indicated by the use API information is unapproved. The license processor 11$b$ also accepts the license approval information from the user device 4 of the application user indicated by the user-specific information corresponding to the license information. The license approval information indicates the approved/disapproved state of the information access authority. Then, the license processor 11$b$ makes the license approval information correspond to the license information and registers them. Performing the registration process with the constitution as the registration server 10 allows clearly describing the regular registration of the service application involving the API use using the service code. The license information specifies the application user. Moreover, the license information can manage the application user in the configuration of giving the license approval. Accordingly, the EC management system 1 can manage the application provider with the service code. Additionally, the EC management system 1 can obtain the registration information in a state where the application user can be managed with the license information. The license information has the constitution that can approve the service execution after the application user recognizes the service. Accordingly, an active opportunity of determining availability on the use of service involving the API use is provided to the application user. In particular, the system assumed in this embodiment is constituted as follows. One or a plurality of application providers provide(s) the service application using the API. The plurality of application users can use the service brought by execution of the service application, which is available for each of them. That is, in a state where the plurality of service applications and the plurality of application users are present, achieving the registration for appropriate management and valid API use is considerably effective in the system management.

The registration server 10 performs the notification process for issuing the license information to the application user. Then, the registration server 10 performs an indication process of information on the service corresponding to the license information and the risk information. In view of this, as the risk information, the use API information is employed. The risk information shows that the application user can perform the license approval while correctly understanding a content and risk of the service application. Including the use API information in the risk information allows the application user to recognize what sort of information is specifically used in the service. This is also appropriate for the active license approval by the application user.

The registration server 10 accepts only the information of the batch approval on one or the plurality of use API information notified as the risk information from the user device 4 as the license approval information. This allows ensuring the service provision in a state where the application provider maintains all API uses, which are original assumed. That is, an environment where the service is always provided with maintaining the original functions can be created. Meanwhile, as long as the registration server 10 accepts the information of the individual approval as the license approval information, an environment where the service provision to which customization (functional restriction) by the application user is added can be created. Accordingly, an intention of restriction by the application user to the information access caused by the service can be closely reflected.

As described in the exemplary process II at service execution, the registration server 10 registers the allowable number of copies making it correspond to the license information. This allows forming an environment for preventing an unrestricted spread of the service application. The registration server 10 also registers the terminal identification information making it correspond to the license information. This allows providing an environment where the registered terminal uses the application. For the application user, this environment prevents the service use from another terminal due to impersonation, a stealing of the license, or a similar cause. The terminal identification information can be registered by the allowable number of copies of the corresponding license information. Thus, an environment where the number of copies of the service application can be managed with the registration of the terminal identification information can be achieved. As described in the exemplary process II at service execution, at the registration of the terminal identification information, the registration server 10 notifies the application user of the fact of the registration. This allows the application user to check whether the service with the license information approved by himself/herself is illegally used at another terminal or not. This allows enhancing the safety of the service use and an effect of preventing an information leak.

The registration server 10 generates the service code in response to the acceptance of the API use registration request through the provider WEB 12. The provider WEB 12 also accepts the license issue request. This allows facilitating a procedure for issuing the service code and a procedure for issuing the license by the application provider. The registration server 10 also accepts the license approval information from the user device 4 through the user WEB 13 and registers the license approval information making it correspond to the license information. This allows facilitating a procedure for approving the license by the application user.

The API provided by the API server 20 is information access API. The information access API is accessible for reading out or writing in the disclosure-restricted-information such as the business information M1$dt$. In this case, the API use by the service application, namely, information safety of the information access can be ensured on the service using the business information M1$dt$ or similar information, which is information unique to the user. The disclosure-restricted-information is, for example, possibly information on business of the application user and information created by the EC management system 1 and is provided to a specific application user, for example, log information in the electronic commerce, the statistical information, and the charging information. However, the API in this exemplary system is not limited to the API that accesses the disclosure-restricted-information. Application of the process of this embodiment to the service that uses the API for accessing open information is effective. For example, this application eliminates free ride of the service or a similar cheating by another person, thus ensuring safety in the service execution. That is, the system of the embodiment is effective to even the open information in a condition where the application user needs to perform the license approval on the access.

The information processing device as the EC management system 1 includes the authentication unit 21. The authentication unit 21 has functions as an authentication processor 21$a$ and a registration information acquisition unit 21$b$. The authentication unit 21 may be configured at the inside of the API server 20 or may be constituted at the information processing device outside of the API server 20. The registration information acquisition unit 21$b$ obtains the registration information where the service identification information, the use API information, the service code, the user-specific information, the license information, and the license approval information of the service application using the API are associated. When the API use request is performed in association with execution of the service application, the authentication processor 21$a$ refers to the registration information based on the service code and the license information. The authentication processor 21$a$ performs the authentication process including at least confirmations of the service code, the use API information, and the license approval information and permits the API use requested according to the authentication result. The inclusion of such authentication unit ensures a state where the API is used within a use range of the regular service application and within a range of the license approval by the application user. Accordingly, the API use in the service falls within the range assumed by the application user, thus maintaining safety of information accessed using the API. In particular, by the authentication using the service code and the use API information linked to the service code, validity of the application provider and the authority within the used API range are confirmed. The authentication based on the license information confirms validity of the application user in the relationship with the application provider and the API use within the approved range of the application user. In view of this, within the range of agreement of intention between two persons, the application provider and the application user, valid API use by the service application is ensured. In particular, performing appropriate authentication in the case where the plurality of service applications and the plurality of application users are present maintains the valid API use, considerably effective in system operation.

Setting the license approval information by the application user also has an aspect of restricting a possibility of an information leak due to the API use within the license approval range. Suppose that even if the API is illegally used by an action that cannot be assumed usually, hacking, or a similar action, the information leak range caused by these actions can fall within the range approved first by the application user. Accordingly, the application user can perform the license approval assuming such worst situation.

Some authentication units 21 perform the authentication process receiving the service code and the license information transmitted from an external terminal device at which the service application has been executed together with the API use request. That is, the authentication unit 21 performs the authentication using the registration information linked to the service code and the license information transmitted together with the API use request. In view of this, validity of the service application and validity of the application user with the license key can be appropriately authenticated. When the authentication process can perform predetermined confirmations on all of the service code, the service identification information, the use API information, and the license approval information, the authentication process permits the API use related to the API use request. This allows achieving an operation giving first priority to ensuring safety of information. The registration information is configured so as to include the terminal identification information corresponding to the license information. In the authentication process, the authentication is also performed on the external terminal device that has transmitted the API use request using the terminal identification information. This allows authentication dealing with illegal copy and an illegal leak of the application program and the license key.

As the exemplary process IV, in response to the API use request, the notification process of generation of the API use request is performed to application user. The application user is indicated by the user-specific information corresponding to the license information. This allows the application user to recognize execution of the application program, also allowing the application user to be given an opportunity of determining whether the service is regularly used or not. This allows finding illegal use such as a stealing of the license key and dealing with such action. In particular, when the API server 20 waits for the confirmation response and then permits the API use, illegal service use is avoidable. Like the exemplary process III, performing the notification process of generation of the API use request to the application provider upon the API use request allows the application provider to recognize execution of the application program. This allows giving an opportunity of determining whether the service is regularly used or not. This allows finding the illegal copy and the stealing of the service application and the service code and taking necessary actions. In particular, when the API server 20 waits for the confirmation response and then permits the API use, illegal service use based on the service code and a spread of the service code is avoidable.

The information processing device as the EC management system 1 includes the result management unit 22. The result management unit 22 may be configured at the inside of the API server 20 or may be constituted at the information processing device outside of the API server 20. In the case where the API use is permitted by the authentication, the result management unit 22 generates result information of the application provider based on the service code in the API use request. Additionally, the result management unit 22 generates the result information of the application user based on the license information. The system of the embodiment performs authentication for execution of the service application involving the API use using the service code and the license information. The service code allows the result management of the application provider while the license information allows the result management of the application user. That is, the results of API use by the respective application provider and application user can be appropriately managed. When the authentication is passed, the result management is performed. In view of this, as the result in the case where the API is actually used, the result managements of the application provider and the application user are possible. In particular, in the case where the plurality of various service applications and the plurality of application users present, valid result managements of the respective service applications and the service applications are achieved. This is considerably effective in the system operation.

The result management unit 22 generates the charging information to the application provider based on the service code in the API use request. Based on the license information in the API use request, the charging information to the application user is generated. That is, the charging management corresponding to the actual API use is achieved to the respective application provider and application user. This allows individual charging of the API rent to the application provider and the application user.

9. Program and Storage Medium

The EC management system 1 as the embodiment of the information processing device of the present invention is as described above. The program of the embodiment is a program that causes the information processing device (CPU or a similar unit) to perform the processes of the registration server 10 and the API server 20 (authentication unit 21 and result management unit 22) in the EC management system 1.

The program of the embodiment generates the service code in response to the API use registration request transmitted from the provider device 3. The API use registration request relates to the service using the application program that uses the API. The service code indicates the registration of this service as the API use service. The program also causes the information processing device to perform a process where the service identification information and the use API information of the service are made correspond to the service code and are registered. The program also causes the information processing device to perform generating the license information corresponding to the user-specific information of the service transmitted from the provider device 3. The information access authority of the license information using the API indicated by the use API information is unapproved. The program also causes the information processing device to perform a process that accepts the license approval information from the user device 4 of the application user indicated by the user-specific information corresponding to the license information. The license approval information indicates the approved/disapproved state of the information access authority. Then, the program causes the information processing device to make the license approval information correspond to the license information and registers them. That is, this program is a program that causes the registration server 10 to perform the processes described in FIG. 6 to FIG. 9. This program may cause the registration server 10 to perform Step S180, which is illustrated in FIG. 21.

The program of the embodiment causes the information processing device to perform a process that obtains the service code and the license information of the API use request for the service using the application program using the API. The program of the embodiment causes the information processing device to perform accessing the registration information based on the service code and the license information of the API use request. In the registration information, the service identification information, the use API information, the service code, the license information, and the license approval information are associated. The service identification information relates to the service and is specified from the provider device 3. The service code indicates the registration of this service as the API use service. The license information is issued corresponding to the user-specific information. The user-specific information identifies the application user specified from the provider device 3. The license approval information indicates an approved/disapproved state of the information access authority using the API indicated by the use API information. The use API information is transmitted from the user device 4 of the application user indicated by the user-specific information corresponding to the license information. Furthermore, with reference to the registration information obtained by the access, the program causes the information processing device to perform the authentication process. The authentication process includes at least verifications of the service code, the use API information, and the license approval information. The program causes the information processing device to perform permitting the requested API use according to the authentication result. That is, this program is a program that causes the information processing device as the API server 20 including the authentication unit 21 to perform the processes described in FIG. 16, FIG. 21, FIG. 24, or FIG. 26 and the processes described in FIG. 17 or FIG. 23.

The program of the embodiment further causes the information processing device to perform the following processes. In the case where the API use is permitted, the information processing device generates the result information of the application provider based on the service code in the API use request. Moreover, the information processing device generates the result information of the application user based on the license information. That is, this program is a program that causes the information processing device as the API server 20 including the result management unit 22 to perform the processes described in FIG. 16, FIG. 21, FIG. 24, or FIG. 26, in particular, the processes described in FIG. 18.

This program can achieve the information processing device as the above-described EC management system 1. An HDD as a recording medium built into equipment such as a computer device, a ROM inside of a microcomputer, which includes a CPU, or a similar medium can preliminary record the program. Alternatively, a removable recording medium such as a semiconductor memory a memory card, an optical disk, a magneto-optical disk, and a magnetic disk can temporarily or perpetually store (record) the program. Such removable recording medium can be provided as so-called package software. This program can be installed from the removable recording medium to a personal computer or a similar device. Additionally, the program can be downloaded from a download site via a network such as LAN and the Internet.

10. Modification

The present invention is not limited to the above-described embodiment but various modifications are possible. The process at the registration and the process at service execution are not limited to the above-described examples. The API use registration request, the license approval, a communications method between the information processing devices in the API use request or in a similar situation, a method for showing information, and a method for input by the application provider and the application user are variously considered. For example, as the processes at the API use, which are exemplarily illustrated in FIG. 16, FIG. 21, FIG. 24, and FIG. 26, the user device 4 where the service application has started may simultaneously transmit the API use request and the actual API process request. In this case, as long as the authentication unit 21 performs the authentication and the result is a pass, the API process is configured to be performed. In FIG. 16, the user device 4 transmits the API use request and the API process request (S323) to the API server 20 at the phase of Step S321. After the API server 20 performs authentication at Step S400, if the result is a pass, the API server 20 permits the API use and performs the API process at Step S404. The notification of the authentication result may be performed as an API process result in the process at Step S404. Accordingly, Steps S401 and S322 are unnecessary. Similarly, as the processes at the API use, the result management process, which is indicated as Step S403, may be performed after the API process, which is indicated as Step S404. Actually, if the result management including a charging process is performed after the API process, an API process result is reflected to the result data. Thus, the result closer to the original result is likely to be reflected to the result data.

The present invention is described with an example of being applied to a network system that conducts an electronic commerce. However, the present invention is not necessarily to be limited to the API use for the service in the electronic commerce. The present invention is a technique applicable to the case where the API is used in various service applications. In this meaning, the application user who uses the service is not limited to a person who operates the electronic store or a similar person.

By the way, the above-described program is a program, for example, for achieving functions regarding registration, authentication, and result management in the EC management system 1. However, from the above-described embodiment, the invention of a program as a service application can also be comprehended. That is, the program is a program having the following configurations.

The program is an application program that causes an information processing device to perform a process. The information processing device is included in a system configured such that an application user is able to use service brought by execution of the provided application program. An application provider provides the application program using a preliminary prepared API to the application user. The process includes the following. A process obtains a service code. The service code indicates registration as this application program API use service accompanied by this application program. A process obtains license information issued corresponding to user-specific information. The user-specific information identifies an application user specified from the application provider device. A process transmits an API use request for API use together with the service code and the license information.

The service application in the above-described embodiment is an embodiment of such program. A storage medium storing such program and an information processing device performing the above-described respective processes with the program are also comprehended as the inventions. That is, the user device 4 and the provider device 3B are embodiments of such information processing device.

REFERENCE SIGNS LIST

1 EC management system, 2 network, 3, 3A, 3B application provider device, 4 application user device, 10 registration server, 11 registration management unit, 11a service code processor, 11b license processor, 12 provider website, 13 user website, 20 API server, 21 authentication unit, 21a authentication processor, 21b registration information acquisition unit, 22 result management unit, 30 registration database, 31 store information database, 32 result database

What is claimed is:

1. An information processing device included in a system configured to enable a plurality of application users to use service brought by execution of an application program available for each user, the application program using a preliminary prepared application program interface (API), the plurality of application programs being provided by at least one application provider, the information processing device comprising:
   at least one non-transitory memory operable to store program code;
   at least one processor operable to read the program code and operate as instructed by the program code, the program code including:
      servicing code that causes said at least one processor to generate a service code in response to receiving an API use registration request from an application provider device, the API use registration request relating to a service using an application program that uses the API, the service code indicating registration of the service as an API use service; generate service identification information and use API information of the service corresponding to the service code; and register the service identification information, the use API information, and the service code; and licensing code that causes the at least one processor to: generate license information corresponding to user-specific information received from the application provider device, the user-specific information specifying a specific application user who uses the service, an information access authority of the license information using an API indicated by the use API information being unapproved; make the license information correspond to the service code; register the license information and the service code; issue license information to the application user, the application user being indicated by the user-specific information corresponding to the license information; accept license approval information from an application user device of the application user indicated by the user-specific information corresponding to the license information, the license approval information indicating an approved/disapproved state of the information access authority; make the license approval information correspond to the license information; and register the license approval information and the license information.

2. The information processing device according to claim 1, wherein
the licensing code further causes the at least one processor to perform a notification process for issuing the license information to the application user, the application user being indicated by the user-specific information corresponding to the license information; and perform an indication process of information on the service corresponding to the license information and risk information.

3. The information processing device according to claim 2, wherein
the licensing code further causes the at least one processor to use the use API information regarding the service corresponding to the license information as the risk information related to the indication process.

4. The information processing device according to claim 3, wherein
the licensing code further causes the at least one processor to accept only information of batch approval at least one of the plurality of use API information notified as the risk information, the information of batch approval being provided from the application user device as the license approval information.

5. The information processing device according to claim 3, wherein
the licensing code further causes the at least one processor to accept information of individual approval on at least one of the plurality of respective use API information notified as the risk information, the information of individual approval being provided from the application user device as the license approval information.

6. The information processing device according to claim 1, wherein
the licensing code further causes the at least one processor to register terminal identification information by an allowable number of copies of corresponding license information; and perform a registration process of the terminal identification information made correspond to the license information.

7. The information processing device according to claim 1, wherein
the servicing code further causes the at least one processor to provide a website configured to be able to obtain at least the service identification information and the use API information from the application provider device, the service code processor being configured to perform generating the service code in response to an acceptance of an API use registration request through the website.

8. The information processing device according to claim 1, wherein
the licensing code further causes the at least one processor provide a website configured to be able to obtain the user-specific information from the application provider device, the license processor being configured to perform generating the license information based on the user-specific information obtained through the website.

9. An information processing method for an information processing device included in a system configured to enable a plurality of application users to use service brought by execution of an application program available for each user, the application program using a preliminary prepared application program interface (API), the plurality of application programs being provided by at least one application provider, the information processing method comprising:
generating a service code in response to receiving an API use registration request from an application provider device, the API use registration request relating to a service using an application program that uses the API, the service code indicating registration of the service as an API use service;
generating service identification information and use API information of the service to the service code;
registering the service identification information, the use API information, and the service code;
generating license information corresponding to user-specific information received from the application provider device, the user-specific information specifying a specific application user who uses the service, an information access authority of the license information using an API indicated by the use API information being unapproved;
making the license information correspond to the service code;
registering the license information and the service code;
issuing license information to the application user, the application user being indicated by the user-specific information corresponding to the license information;
accepting license approval information from an application user device of the application user indicated by the user-specific information corresponding to the license information, the license approval information indicating an approved/disapproved state of the information access authority;
making the license approval information correspond to the license information; and
registering the license approval information and the license information.

10. The information processing method according to claim 9, further comprising performing
indicating information on the service corresponding to the license information and risk information; and issuing the license information to the application user, the application user being indicated by the user-specific information corresponding to the license information.

11. The information processing method according to claim 10, wherein
the indicating information uses the use API information regarding the service corresponding to the license information as the risk information related to the indication process.

12. The information processing method according to claim 11, wherein
the indicating information accepts only information of batch approval on at least one of the plurality of use API information notified as the risk information, the information of batch approval being provided from the application user device as the license approval information.

13. The information processing method according to claim 12, wherein
the indicating information accepts information of individual approval on at least one of the plurality of respective use API information notified as the risk information, the information of individual approval being provided from the application user device as the license approval information.

14. The information processing method according to claim 9, further comprising:
registering terminal identification information made to correspond to the license information; and
setting the terminal identification information to regulate an allowable number of copies of corresponding license information.

15. The information processing method according to claim 9, further comprising:
providing a website configured to be able to obtain at least the service identification information and the use API information from the application provider device; and
generating the service code in response to an acceptance of an API use registration request through the website.

16. The information processing method according to claim 9, further comprising:
providing a website configured to be able to obtain the user-specific information from the application provider device; and
generating the license information based on the user-specific information obtained through the website.

17. An information processing device included in a system configured to enable a plurality of application users to use service brought by execution of an application program available for each user, the application program using a preliminary prepared application program interface (API), the plurality of application programs being provided by at least one application provider, the information processing device comprising:
at least one non-transitory memory operable to store program code;
at least one processor operable to read the program code and operate as instructed by the program code, the program code including:
registration code that causes the at least one processor to obtain registration information comprising service identification information, use API information, a service code, license information, and license approval information, the service identification information relating to a service using an application program that uses the API, the service identification information being specified from the application provider device, the use API information indicating at least one of a plurality of used APIs, the service code being configured to indicate registration of the service as API use service, the license information being generated corresponding to the user-specific information, the user-specific information being configured to identify an application user specified from the application provider device, the license approval information being configured to indicate an approved/disapproved state of the information access authority using the API indicated by the use API information, the use API information being received from the application user device of the application user indicated by the user-specific information corresponding to the license information; and
authentication code that causes the at least one processor to perform an authentication process with reference to the obtained registration information, the authentication process including confirmation of regular registration with the service code, confirmation of match of API requested for use by the API use request and the use API information, confirmation of validity of the license information, and approval confirmation with the license approval information, the authentication processor being configured to permit the requested API use according to an authentication result when an API use request is performed in association with execution of the service application.

18. The information processing device according to claim 17, wherein
the service code and the license information are received together with the API use request from an external terminal device that has executed the application program.

19. The information processing device according to claim 17, wherein
the authentication code further causes the at least one processor to confirm the service code, the service identification information, the use API information, the license information, and the license approval information.

20. The information processing device according to claim 17, wherein
the registration information comprises terminal identification information corresponding to the license information, and
the authentication code further causes the at least one processor to perform authentication on an external terminal device using the terminal identification information, the external terminal device having executed the application program and transmitting the API use request.

21. The information processing device according to claim 17, wherein
the authentication code further causes the at least one processor to perform a notification process of generating the API use request to the application user in response to the API use request, the application user being indicated by the user-specific information corresponding to the license information.

22. The information processing device according to claim 17, wherein
the service code comprises information on the application provider, and
the authentication code further causes the at least one processor to perform a notification process of generation of the API use request to an application provider in response to the API use request, the application provider being indicated by information on the application provider corresponding to the service code.

23. An information processing method for an information processing device included in a system configured to enable a plurality of application users to use service brought by execution of an application program available for each user, the application program using a preliminary prepared application program interface (API), the plurality of application programs being provided by at least one application provider, the information processing method comprising:
   obtaining a service code and license information regarding an API use request from a service using an application program that uses the API;
   accessing registration information based on a service code and license information regarding the API use request from the application provider device, the registration information comprising service identification information, use API information, the service code, license information, and license approval information being associated, the service identification information relating to the service, the service code indicating registration of the service as an API use service, the license information being generated in accordance with the user-specific information, the user-specific information identifying an application user specified from the application provider device, the license approval information indicating an approved/disapproved state of information access authority using the API indicated by the use API information, the use API information being received from the application user device of the application user indicated by the user-specific information corresponding to the license information; and
   with reference to the obtained registration information, performing an authentication process, the authentication process comprising confirming regular registration with the service code, confirming match of API requested for use by the API use request and the use API information, confirming validity of the license information, confirming approval with the license approval information, and permitting the requested API use according to an authentication result.

24. The information processing method according to claim 23, wherein
   the authentication process comprises receiving the service code and the license information together with the API use request from an external terminal device that has executed the application program.

25. The information processing method according to claim 23,
   further comprising permitting, in response to the authentication process confirming each of a service code, service identification information, use API information, license information, and license approval information, an API use related to an API use request.

26. The information processing method according to claim 23, wherein
   the registration information comprises terminal identification information corresponding to the license information, and
   the authentication process comprises performing authentication using the terminal identification information on an external terminal device that has executed the application program and transmitted the API use request.

27. The information processing method according to claim 23, further comprising
   performing a notification process of generating the API use request to an application user, the application provider being indicated by the user-specific information corresponding to the license information.

28. The information processing method according to claim 23, wherein
   in the registration information, information on an application provider is associated with the service code, and
   the information processing method further comprises performing, in response to the API use request, a notification process of generating the API use request to an application provider, the application provider being indicated by information on the application provider corresponding to the service code.

* * * * *